(12) United States Patent
Yu et al.

(10) Patent No.: US 11,451,423 B2
(45) Date of Patent: Sep. 20, 2022

(54) MIDAMBLE INDICATION AND RECEIVING METHODS AND APPARATUSES

(71) Applicant: Huawei Technologies Co., Ltd., Shenzhen (CN)

(72) Inventors: Jian Yu, Shenzhen (CN); Shimon Shilo, Hod Hasharon (IL); Genadiy Tsodik, Hod Hasharon (IL); Oded Redlich, Hod Hasharon (IL); Yaron Ben-Arie, Hod Hasharon (IL); Doron Ezri, Hod Hasharon (IL); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/324,826

(22) Filed: May 19, 2021

(65) Prior Publication Data
US 2021/0273837 A1 Sep. 2, 2021

Related U.S. Application Data

(63) Continuation of application No. 16/804,467, filed on Feb. 28, 2020, now Pat. No. 11,044,132, which is a
(Continued)

(51) Int. Cl.
*H04L 27/26* (2006.01)
*H04L 1/00* (2006.01)
(Continued)

(52) U.S. Cl.
CPC ........ *H04L 27/2613* (2013.01); *H04L 1/0003* (2013.01); *H04L 5/0023* (2013.01);
(Continued)

(58) Field of Classification Search
CPC . H04L 5/0048; H04L 27/2613; H04L 5/0023; H04L 27/2607; H04L 25/0202
(Continued)

(56) References Cited

U.S. PATENT DOCUMENTS

| 8,462,863 B1 | 6/2013 | Zhang et al. |
| 9,351,333 B1 | 5/2016 | Zhang et al. |

(Continued)

FOREIGN PATENT DOCUMENTS

| CN | 103209043 A | 7/2013 |
| CN | 105656533 A | 6/2016 |

(Continued)

OTHER PUBLICATIONS

3GPP TR 34.943 V2.0.0 (Jun. 2005); "3rd Generation Partnership Project;Technical Specification Group (TSG) Terminal; Analysis of Difference between FDD and 1.28Mcps TDD and Corresponding Effect on Terminal Conformance Test in RadioAccess Stratum Protocol Aspects(Release 5);" Jun. 2005, 151 pages.
(Continued)

*Primary Examiner* — Emmanuel Bayard
(74) *Attorney, Agent, or Firm* — Conley Rose, P.C.

(57) ABSTRACT

A midamble indication method includes sending, by a first device, midamble indication information to a second device. A duration of a midamble indicated by the midamble indication information is greater than or equal to a threshold. The threshold is related to a processing capability of the second device. In a midamble receiving method, the second device receives the midamble according to the indication information.

20 Claims, 5 Drawing Sheets

---

301

A sending device sends midamble indication information to a receiving device, where a duration of a midamble indicated by the midamble indication information is greater than or equal to a threshold

302

The receiving device receives the midamble based on the duration of the midamble indicated by the midamble indication information

Related U.S. Application Data continuation of application No. PCT/CN2018/101869, filed on Aug. 23, 2018.

(51) Int. Cl.
| | |
|---|---|
| *H04L 5/00* | (2006.01) |
| *H04L 25/02* | (2006.01) |
| *H04L 27/20* | (2006.01) |
| *H04W 72/04* | (2009.01) |

(52) U.S. Cl.
CPC ........ *H04L 5/0048* (2013.01); *H04L 25/0202* (2013.01); *H04L 27/2085* (2013.01); *H04L 27/2607* (2013.01); *H04W 72/048* (2013.01)

(58) Field of Classification Search
USPC .......................................... 375/219, 220, 260
See application file for complete search history.

(56) References Cited

U.S. PATENT DOCUMENTS

| | | | |
|---|---|---|---|
| 9,596,715 | B1 | 3/2017 | Zhang et al. |
| 9,706,599 | B1 | 7/2017 | Zhang et al. |
| 10,070,482 | B1* | 9/2018 | Zhang ................. H04L 27/2602 |
| 10,567,046 | B2 | 2/2020 | Choi et al. |
| 11,044,132 | B2* | 6/2021 | Yu ....................... H04L 27/2613 |
| 2013/0343369 | A1 | 12/2013 | Yamaura |
| 2016/0286551 | A1 | 9/2016 | Lee et al. |
| 2016/0301452 | A1 | 10/2016 | Kwon et al. |
| 2016/0323848 | A1 | 11/2016 | Azizi et al. |
| 2017/0134043 | A1 | 5/2017 | Lee et al. |
| 2018/0014327 | A1 | 1/2018 | Park |
| 2018/0131469 | A1 | 5/2018 | Liu et al. |
| 2018/0146076 | A1 | 5/2018 | Verma et al. |
| 2018/0270086 | A1 | 9/2018 | Lin et al. |
| 2018/0359066 | A1 | 12/2018 | Mu et al. |
| 2019/0013978 | A1 | 1/2019 | Zhou et al. |
| 2020/0228634 | A1 | 7/2020 | Noh et al. |
| 2021/0337526 | A1* | 10/2021 | Nam ...................... H04B 7/088 |

FOREIGN PATENT DOCUMENTS

| | | |
|---|---|---|
| CN | 106533522 A | 3/2017 |
| CN | 106789761 A | 5/2017 |
| CN | 106888179 A | 6/2017 |
| WO | 2016106753 A1 | 7/2016 |

OTHER PUBLICATIONS

XP068116402 IEEE 802.11-17/0995r0 Hongyuan Zhang et al., "Doppler Comment Resolution", dated Jul. 9, 2017, 15 pages.

XP068116322 IEEE 802/11-17/0960r0 Lochan Verma et al., "Follow-up on Doppler Design in 802.11ax," Jul. 9, 2017, 16 pages.

XP068137558 IEEE P802.11ax /D1.4, "Draft Standard for Information Technology; Telecommunications and Information exchange between systems Local and Metropolitan area networks; Specific Requirements, Part 11: Wireless LAN Medium Access Control (MAC) and Physical Layer (PHY) Specifications, Amendment 6: Enhancements for High Efficiency WLAN," IEEE Computer Society, Aug. 2017, 534 pages.

IEEE P802.11ax/D1.3, "Part 11: Wireless LAN Medium Access Control (MAC) and Physical Layer (PHY) Specifications-Amendment 6: Enhancements for High Efficiency WLAN," Jun. 2017, 522 pages.

Youhan Kim (Qualcomm), CR on LTF/GI for HE ER SU PPDU, IEEE 802.11-17/0813r1, IEEE, Internet URL:https://mentor.ieee.org/802.11/dcn/17/11-17-0813-01-00ax-cr-on-ltf-gi-for-he-er-su-ppdu.docx>, May 2017, Total 3 Pages.

\* cited by examiner

MIDAMBLE INDICATION AND RECEIVING METHODS AND APPARATUSES

CROSS-REFERENCE TO RELATED APPLICATIONS

This application is a continuation of U.S. patent application Ser. No. 16/804,467 filed on Feb. 28, 2020, which is a continuation of International Patent Application No. PCT/CN2018/101869 filed on Aug. 23, 2018, which claims priority to Chinese Patent Application No. 201710776252.7 filed on Aug. 31, 2017. All of the aforementioned patent applications are hereby incorporated by reference in their entireties.

TECHNICAL FIELD

This application relates to the field of wireless communications technologies, and in particular, to midamble indication and receiving methods and apparatuses.

BACKGROUND

In high efficiency wireless local area network communications, data can be transmitted between devices by using a data unit structure shown in Table 1. As shown in Table 1, a data unit includes a legacy preamble. The legacy preamble includes a legacy short training field (L-STF), a legacy long training field (L-LTF), and a legacy signal (L-SIG) field. After the legacy preamble, there are a repeated L-SIG field, a high-efficiency (HE) signal field A (HE-SIG-A), a HE short training field (HE-STF), and a HE long training field (HE-LTF). The HE-LTF is used for channel estimation and may include one or more HE-LTF symbols used to perform channel estimation on a plurality of space time streams (STS). Then, a data part follows and is used to carry a medium access control (MAC) frame. At the end, there is a packet extension (PE) used to help a receiving device obtain a longer time for processing.

TABLE 1

| L-STF | L-LTF | L-SIG | Repeated L-SIG | HE-SIG-A | HE-STF | HE-LTF | Data | PE |
|---|---|---|---|---|---|---|---|---|

In scenarios usually considered by wireless local area network (WLAN) systems, a device is relatively static and, for example, it is assumed that a channel does not significantly change in a period of time. Therefore, assuming that a channel state of a subsequent data field is the same as a channel state when a HE-LTF is received, a data receiving device decodes, after performing channel estimation based on the HE-LTF, the data field by using a result of the channel estimation that is performed based on the HE-LTF.

In some scenarios in which movement of a device or movement of another device nearby causes a Doppler phenomenon, such as channel changes over time. Therefore, a midamble may be inserted into data symbols, so that a receiving device can re-perform channel estimation based on the midamble to avoid an error in decoding by the receiving device.

However, in a Doppler scenario, various types of information about the midamble are not explicitly defined.

SUMMARY

This application provides midamble indication and receiving methods and apparatuses, to enable a second device to correctly decode a received data symbol based on a midamble sent by a first device.

According to a first aspect, this application provides a midamble indication method, including sending, by a first device, midamble indication information to a second device. A duration of an HE-LTF symbol included in a midamble indicated by the midamble indication information belongs to an HE-LTF symbol duration set.

In the foregoing method, the duration of the midamble indicated by the midamble indication information belongs to a preset midamble duration set, and the midamble indication information cannot indicate a duration not belonging to the midamble duration set, so that a duration of a subsequently sent midamble meets a threshold for a midamble.

In a possible implementation, the HE-LTF symbol duration set includes one of the following or any combination thereof the duration of the HE-LTF symbol excluding a guard interval (GI) part being four basic symbol durations and a duration of a GI being 0.8 µs, the duration of the HE-LTF symbol excluding a GI part being four basic symbol durations and a duration of a GI being 1.6 µs, the duration of the HE-LTF symbol excluding a GI part being four basic symbol durations and a duration of a GI being 3.2 µs, the duration of the HE-LTF symbol excluding a GI part being two basic symbol durations and a duration of a GI being 0.8 µs, the duration of the HE-LTF symbol excluding a GI part being two basic symbol durations and a duration of a GI being 1.6 µs, and the duration of the HE-LTF symbol excluding a GI part being two basic symbol durations and a duration of a GI being 3.2 µs.

According to a second aspect, an embodiment of this application provides a midamble receiving method, including receiving, by a second device, midamble indication information sent by a first device. A duration of an HE-LTF symbol included in a midamble indicated by the midamble indication information belongs to an HE-LTF symbol duration set.

In a possible implementation, the HE-LTF symbol duration set includes one of the following or a combination thereof the duration of the HE-LTF symbol excluding a GI part being four basic symbol durations and a duration of a GI being 0.8 µs, the duration of the HE-LTF symbol excluding a GI part being four basic symbol durations and a duration of a GI being 1.6 µs, the duration of the HE-LTF symbol excluding a GI part being four basic symbol durations and a duration of a GI being 3.2 µs, the duration of the HE-LTF symbol excluding a GI part being two basic symbol durations and a duration of a GI being 0.8 µs, the duration of the HE-LTF symbol excluding a GI part being two basic symbol durations and a duration of a GI being 1.6 µs, and the duration of the HE-LTF symbol excluding a GI part being two basic symbol durations and a duration of a GI being 3.2 µs.

According to a third aspect, this application provides a midamble indication method, including sending, by a first device, midamble indication information to a second device. A duration of a midamble indicated by the midamble indication information is greater than or equal to a threshold, and the threshold is related to a processing capability of the second device.

In the foregoing method, the first device sends the midamble indication information to the second device, so that the second device can receive the midamble according to the indication information. Furthermore, a duration of processing the midamble does not significantly increase as the duration of the midamble increases. Therefore, the fact that the duration of the midamble is greater than or equal to the threshold helps avoid a case in which after receiving the midamble, the second device may have no time to correctly decode a data symbol based on the midamble due to the limited processing capability.

In a possible implementation, the midamble indication information includes indication information used to indicate a quantity of HE-LTF symbols included in the midamble, and indication information used to indicate a duration of an HE-LTF symbol, where a product of the duration of the HE-LTF symbol and the quantity of HE-LTF symbols is greater than or equal to the preset threshold, or indication information of the duration of the midamble, including indication information used to indicate a quantity of STS used by the midamble, and indication information used to indicate a duration of an HE-LTF symbol, where a product of the duration of the HE-LTF symbol and a quantity of HE-LTF symbols corresponding to the STS is greater than or equal to the preset threshold.

The duration of the midamble is a product of the quantity of HE-LTF symbols and a total duration of an HE-LTF and a GI. Furthermore, in some cases, the midamble indication information may not directly provide the quantity of HE-LTF symbols. Instead, the quantity of STS is carried in the indication information. Because the quantity of STS has a correspondence with the quantity of HE-LTF symbols, the second device can determine the corresponding quantity of HE-LTF symbols based on the quantity of STS and further determine the duration of the midamble.

In a possible implementation, the midamble indication information includes at least indication information used to indicate a duration of an HE-LTF symbol excluding a GI part and a duration of a GI. The duration of the HE-LTF symbol excluding the GI part is two or four basic symbol durations.

A basic symbol duration is 3.2 µs, and a minimum duration of a GI is 0.8 µs. Therefore, if a duration of an HE-LTF symbol included in a midamble and excluding a GI part is two or four basic symbol durations, a total duration of the HE-LTF symbol is at least 7.2 µs or 13.6 µs. In one example, a duration of the midamble is at least 7.2 µs or 13.6 µs, which can satisfy most devices for a duration of processing a midamble.

In a possible implementation, the midamble indication information is different from indication information determined by the first device and used to indicate an HE-LTF in a preamble.

Further, the duration of the midamble indicated by the midamble indication information is different from a duration of the HE-LTF indicated by the indication information of the HE-LTF.

Both the midamble and the HE-LTF in the preamble can be used for channel estimation. However, the midamble is sent while being inserted into data symbols. In this case, a data receiving device should perform channel estimation based on the midamble after finishing demodulating data symbols before the midamble. The foregoing process should be finished before the first data symbol after the midamble is completely received. Therefore, the midamble has more specifications for a duration. The midamble and the HE-LTF in the preamble have different specifications for a duration, and therefore, different indication information is used to indicate different durations, thereby helping reduce signaling overheads.

In a possible implementation, the midamble indication information includes a period field of the midamble, and the period field occupies at least two bits and is used to indicate one of at least three preset midamble periods.

In the foregoing manner, at least four different midamble periods are provided for the midamble, to address the Doppler effect for channel estimation in different scenarios. For example, when a device moves at a relatively low speed and a channel changes relatively slow, a relatively long period may be used, or on a train traveling at a high speed with a channel changing relatively fast, a short period may be used.

In a possible implementation, the sending, by a first device, midamble indication information to a second device includes sending, by the first device to the second device through a reserved entry in a spatial reuse parameter (SRP) field, a period of the midamble and/or the indication information used to indicate the duration of the HE-LTF symbol, or sending, by the first device to the second device through a reserved bit, the indication information used to indicate the duration of the HE-LTF symbol.

There are some reserved bits or reserved entries in a data frame. Therefore, these reserved bits or reserved entries are used to send the midamble indication information, to fully utilize an existing frame structure.

In a possible implementation, before sending, by a first device, midamble indication information to a second device, the method further includes obtaining, by the first device, information about a midamble processing capability of the second device, and determining, by the first device, the threshold based on the capability information.

Different devices have different processing capabilities. Some devices have a high processing speed or are capable of performing parallel processing, and do not have relatively high requirements for a duration of a midamble. However, some devices have a relatively low processing speed or are incapable of performing parallel processing, and have relatively high requirements for a duration of a midamble. The first device determines the threshold based on the processing capability of the second device, thereby effectively avoiding a decoding error caused when the second device cannot perform processing in a timely manner.

In a possible implementation, after sending, by a first device, midamble indication information to a second device, the method further includes sending, by the first device, a midamble to the second device. The midamble is obtained by padding content included in an agreed midamble, and a duration of the midamble after padding is greater than or equal to the threshold.

The content of the midamble is pre-agreed. The second device performs channel estimation based on the received midamble and the content of the known midamble. In the foregoing method, the content of the pre-agreed midamble is padded, so that the duration of the midamble after padding is greater than or equal to the threshold. The content of and a position for padding may be pre-agreed, or the content and the position may be notified to the second device by using the midamble indication information.

According to a fourth aspect, an embodiment of this application provides a midamble receiving method, including sending, by a first device, midamble indication information to a second device. A duration of a midamble indicated by the midamble indication information is greater than or equal to a threshold, and the threshold is related to a processing capability of the second device.

Further, the second device receives the midamble according to the midamble indication information.

In a possible implementation, before receiving, by a second device, midamble indication information sent by a first device, the method further includes sending, by the second device, information about a midamble processing capability of the second device to the first device.

In a possible implementation, the midamble indication information includes indication information used to indicate a quantity of HE-LTF symbols included in the midamble, and indication information used to indicate a duration of an HE-LTF symbol, where a product of the duration of the HE-LTF symbol and the quantity of HE-LTF symbols is greater than or equal to the preset threshold, or indication information of the duration of the midamble, including indication information used to indicate a quantity of STS used by the midamble, and indication information used to indicate a duration of an HE-LTF symbol, where a product of the duration of the HE-LTF symbol and a quantity of HE-LTF symbols corresponding to the STS is greater than or equal to the preset threshold.

In a possible implementation, the midamble indication information includes at least indication information used to indicate a duration of an HE-LTF symbol excluding a GI part and a duration of a GI. The duration of the HE-LTF symbol excluding the GI part is two or four basic symbol durations.

In a possible implementation, the midamble indication information is different from indication information determined by the first device and used to indicate an HE-LTF in a preamble.

Further, the duration of the midamble indicated by the midamble indication information is different from a duration of the HE-LTF indicated by the indication information of the HE-LTF.

In a possible implementation, the midamble indication information includes a period field of the midamble, and the period field occupies at least two bits and is used to indicate one of at least four preset midamble periods.

In a possible implementation, receiving, by a second device, midamble indication information sent by a first device includes receiving, by the second device through a reserved entry in an SRP field, a period of the midamble and/or the indication information used to indicate the duration of the HE-LTF symbol, or receiving, by the second device through a reserved bit, the indication information used to indicate the duration of the HE-LTF symbol.

In a possible implementation, after receiving, by a second device, midamble indication information sent by a first device, the method further includes receiving, by the second device, a midamble according to the midamble indication information. The midamble is obtained by padding content included in an agreed midamble, and a duration of the midamble after padding is greater than or equal to the threshold.

According to a fifth aspect, an embodiment of this application provides a midamble indication method, including obtaining, by a first device, information about a midamble processing capability of a second device, and sending, by the first device, midamble indication information to the second device. A duration of a midamble indicated by the midamble indication information is determined based on the capability information of the second device.

In the foregoing method, the first device determines the midamble indication information based on the information about the midamble processing capability of the second device, to help avoid a case in which after receiving the midamble, the second device may have no time to correctly decode a data symbol based on the midamble due to the limited processing capability.

In a possible implementation, the capability information includes at least one of the following information a minimum value of the duration of the midamble that can be supported by the second device, information about whether the second device can support a single-user Doppler mode and/or an extended distance single-user Doppler mode, information about whether the second device can support a multi-user Doppler mode, a maximum quantity of STS occupied by the midamble and that can be supported by the second device, a maximum quantity of subcarriers occupied by the midamble and that can be supported by the second device, and information about a modulation and coding scheme (MCS) that can be supported by the second device when the midamble occupies L subcarriers and K STS, where both L and K are integers greater than or equal to 1.

In a possible implementation, the midamble indication information is different from indication information determined by the first device and used to indicate an HE-LTF in a preamble.

Further, the duration of the midamble indicated by the midamble indication information is different from a duration of the HE-LTF indicated by the indication information of the HE-LTF.

In a possible implementation, the midamble indication information includes a period field of the midamble, and the period field occupies at least two bits and is used to indicate one of at least three preset midamble periods.

In a possible implementation, sending, by the first device, midamble indication information to the second device includes sending, by the first device to the second device through a reserved entry in an SRP field, a period of the midamble and/or the indication information used to indicate the duration of the HE-LTF symbol, or sending, by the first device to the second device through a reserved bit, the indication information used to indicate the duration of the HE-LTF symbol.

In a possible implementation, after sending, by the first device, midamble indication information to the second device, the method further includes sending, by the first device, a midamble to the second device. The midamble is obtained by padding content included in an agreed midamble, and a duration of the midamble after padding is greater than or equal to the threshold.

According to a sixth aspect, an embodiment of this application provides a midamble receiving method, including sending, by a second device, information about a midamble processing capability of the second device to a first device, receiving, by the second device, midamble indication information sent by the first device, where a duration of a midamble indicated by the midamble indication information is determined based on the capability information of the second device, and receiving, by the second device, the midamble according to the indication information.

In a possible implementation, the capability information includes one of the following or a combination thereof a minimum value of the duration of the midamble that can be supported by the second device, information about whether the second device can support a single-user Doppler mode and/or an extended distance single-user Doppler mode, information about whether the second device can support a multi-user Doppler mode, a maximum quantity of STS occupied by the midamble and that can be supported by the second device, a maximum quantity of subcarriers occupied by the midamble and that can be supported by the second device, and information about a MCS that can be supported by the second device when the midamble occupies L subcarriers and K STS, where both L and K are integers greater than or equal to 1.

In a possible implementation, the midamble indication information is different from indication information determined by the first device and used to indicate an HE-LTF in a preamble.

Further, the duration of the midamble indicated by the midamble indication information is different from a duration of the HE-LTF indicated by the indication information of the HE-LTF.

In a possible implementation, the midamble indication information includes a period field of the midamble, and the period field occupies at least two bits and is used to indicate one of at least three preset midamble periods.

In a possible implementation, the second device receives, through a reserved entry in an SRP field, a period of the midamble and/or the indication information used to indicate the duration of the HE-LTF symbol, or the second device receives, through a reserved bit, the indication information used to indicate the duration of the HE-LTF symbol.

The sending, by the first device, the midamble indication information to the second device includes sending, by the first device to the second device through a reserved entry in an SRP field, a period of the midamble and/or the indication information used to indicate the duration of the HE-LTF symbol, or sending, by the first device to the second device through a reserved bit, the indication information used to indicate the duration of the HE-LTF symbol.

In a possible implementation, after receiving, by the second device, midamble indication information sent by the first device, the method further includes receiving a midamble sent by the first device. The midamble is obtained by padding content included in an agreed midamble, and a duration of the midamble after padding is greater than or equal to the threshold.

According to a seventh aspect, an embodiment of this application provides a midamble indication method, including sending, by a first device, midamble indication information to a second device. The midamble indication information is different from indication information of an HE-LTF in a preamble sent by the first device to the second device.

According to the foregoing method, the HE-LTF in the preamble and a midamble can be flexibly indicated.

In a possible implementation, a duration of an HE-LTF symbol included in a midamble indicated by the midamble indication information is different from a duration of an HE-LTF symbol included in the HE-LTF indicated by the indication information of the HE-LTF.

Optionally, the HE-LTF in the preamble may use an HE-LTF symbol with a relatively short duration, while it indicates that the midamble uses an HE-LTF symbol with a relatively long duration. In the foregoing method, information about the duration of the midamble and information about the duration of the HE-LTF in the preamble are separately indicated, and therefore, a limitation on the duration of the midamble does not affect the HE-LTF in the preamble, thereby helping reduce signaling overheads of the preamble.

Optionally, the HE-LTF in the preamble may use an HE-LTF symbol with a relatively long duration, or use a relatively large quantity of HE-LTF symbols, to make initialization of channel estimation more accurate. On the other hand, the midamble uses an HE-LTF symbol with a relatively short duration or uses a relatively small quantity of HE-LTF symbols. A data receiving device performs an analysis by using a channel estimation result obtained based on the midamble and an initial channel estimation result, to improve accuracy of the channel estimation, and help reduce signaling overheads of the midamble.

According to an eighth aspect, an embodiment of this application provides a midamble receiving method, including receiving, by a second device, midamble indication information sent by a first device, where the midamble indication information is different from indication information of an HE-LTF sent by the first device to the second device, and receiving, by the second device, a midamble according to the indication information.

In a possible implementation, a duration of an HE-LTF symbol included in a midamble indicated by the midamble indication information is different from a duration of an HE-LTF symbol included in the HE-LTF indicated by the indication information of the HE-LTF.

According to a ninth aspect, an embodiment of this application provides a midamble indication method, including sending, by a first device, midamble indication information to a second device. The midamble indication information is used to instruct the second device to decode, after receiving a midamble, an $(X+1)^{th}$ to $(X+M)^{th}$ data symbols after the midamble based on the midamble. M signifies that the first device sends a midamble after sending every M data symbols, and X is an integer pre-agreed or determined based on a midamble processing capability of the second device and greater than or equal to 1.

In the foregoing method, the midamble is sent based on a position indicated by the midamble indication information, to provide a buffer time for a data receiving device to perform channel estimation and help avoid a case in which after receiving the midamble, the receiving device may have no time to correctly decode a data symbol based on the midamble due to the limited processing capability.

According to a tenth aspect, an embodiment of this application provides a midamble receiving method, including receiving, by a second device, a midamble, performing, by the second device, channel estimation based on the midamble, and decoding, by the second device, an $(X+1)^{th}$ to $(X+M)^{th}$ data symbols after the midamble based on a channel estimation result. M signifies that the second device receives a midamble after receiving every M data symbols, and X is an integer pre-agreed or determined based on a midamble processing capability of the second device and greater than or equal to 1.

According to an eleventh aspect, an embodiment of this application provides a device. The device is used as a first device, and includes a processing unit and a sending unit. These units can perform corresponding functions in the method examples according to the first aspect. For details, refer to detailed descriptions in the method examples, and details are not described herein again.

According to a twelfth aspect, an embodiment of this application provides a device. The device is used as a second device, and includes a receiving unit and a processing unit. These units can perform corresponding functions in the method examples according to the second aspect. For details, refer to detailed descriptions in the method examples, and details are not described herein again.

According to a thirteenth aspect, an embodiment of this application provides a device. The device is used as a first device, and includes a processing unit and a sending unit.

These units can perform corresponding functions in the method examples according to the third aspect. For details, refer to detailed descriptions in the method examples, and details are not described herein again.

According to a fourteenth aspect, an embodiment of this application provides a device. The device is used as a second device, and includes a receiving unit and a processing unit. These units can perform corresponding functions in the method examples according to the fourth aspect. For details, refer to detailed descriptions in the method examples, and details are not described herein again.

According to a fifteenth aspect, an embodiment of this application provides a device. The device is used as a first device, and includes a processing unit and a sending unit. These units can perform corresponding functions in the method examples according to the fifth aspect. For details, refer to detailed descriptions in the method examples, and details are not described herein again.

According to a sixteenth aspect, an embodiment of this application provides a device. The device is used as a second device, and includes a sending unit and a receiving unit. These units can perform corresponding functions in the method examples according to the sixth aspect. For details, refer to detailed descriptions in the method examples, and details are not described herein again.

According to a seventeenth aspect, an embodiment of this application provides a device. The device is used as a first device, and includes a processing unit and a sending unit. These units can perform corresponding functions in the method examples according to the seventh aspect. For details, refer to detailed descriptions in the method examples, and details are not described herein again.

According to an eighteenth aspect, an embodiment of this application provides a device. The device is used as a second device, and includes a receiving unit and a processing unit. These units can perform corresponding functions in the method examples according to the eighth aspect. For details, refer to detailed descriptions in the method examples, and details are not described herein again.

According to a nineteenth aspect, an embodiment of this application provides a device. The device is used as a first device, and includes a processing unit and a sending unit. These units can perform corresponding functions in the method examples according to the third aspect. For details, refer to detailed descriptions in the method examples, and details are not described herein again.

According to a twentieth aspect, an embodiment of this application provides a device. The device is used as a second device, and includes a receiving unit and a processing unit. These units can perform corresponding functions in the method examples according to the fourth aspect. For details, refer to detailed descriptions in the method examples, and details are not described herein again.

According to a twenty-first aspect, an embodiment of this application further provides a computer storage medium. The storage medium stores a software program. The software program, when being read and executed by one or more processors, can implement the method in any one of the embodiments according to the first to tenth aspects.

DESCRIPTION OF EMBODIMENTS

To make the objectives, technical solutions, and advantages of this application clearer, the following further describes this application in detail with reference to the accompanying drawings.

In some wireless local area network scenarios, a data sending device and a data receiving device may be moving relative to each other. The Doppler effect produced by the relative movement causes a channel state to change during data transmission. Therefore, if a channel estimation result obtained based on an HE-LTF in a preamble is used to decode a data symbol received when the channel state has significantly changed, a decoding error may occur.

To resolve the foregoing problem, a midamble may be inserted, after every M data symbols, into a data field, so that the receiving device can re-perform channel estimation based on the midamble and decode a subsequently received data symbol based on a new channel estimation result.

For example, an HE-SIG-A field may include information indicating whether to use a Doppler mode. When the Doppler mode is enabled, a data unit structure may be shown in Table 2.

TABLE 2

| L-STF | L-LTF | L-SIG | Repeated L-SIG | HE-SIG-A | HE-STF | HE-LTF | Data | Mid-amble | Data | Mid-amble | Data | PE |
| --- | --- | --- | --- | --- | --- | --- | --- | --- | --- | --- | --- | --- |

Content of a midamble is usually the same as content of an HE-LTF in a preamble.

Using one scenario as an example, an HE-SIG-A field indicates that when a Doppler mode is used, a data unit uses one STS, an HE-LTF in a preamble and a midamble each include one HE-LTF symbol, and one HE-LTF symbol includes a GI with a duration of 0.8 μs and a non-GI part of one basic symbol duration (a basic symbol duration is 3.2 μs and may be signified by 1×).

Figure 1:
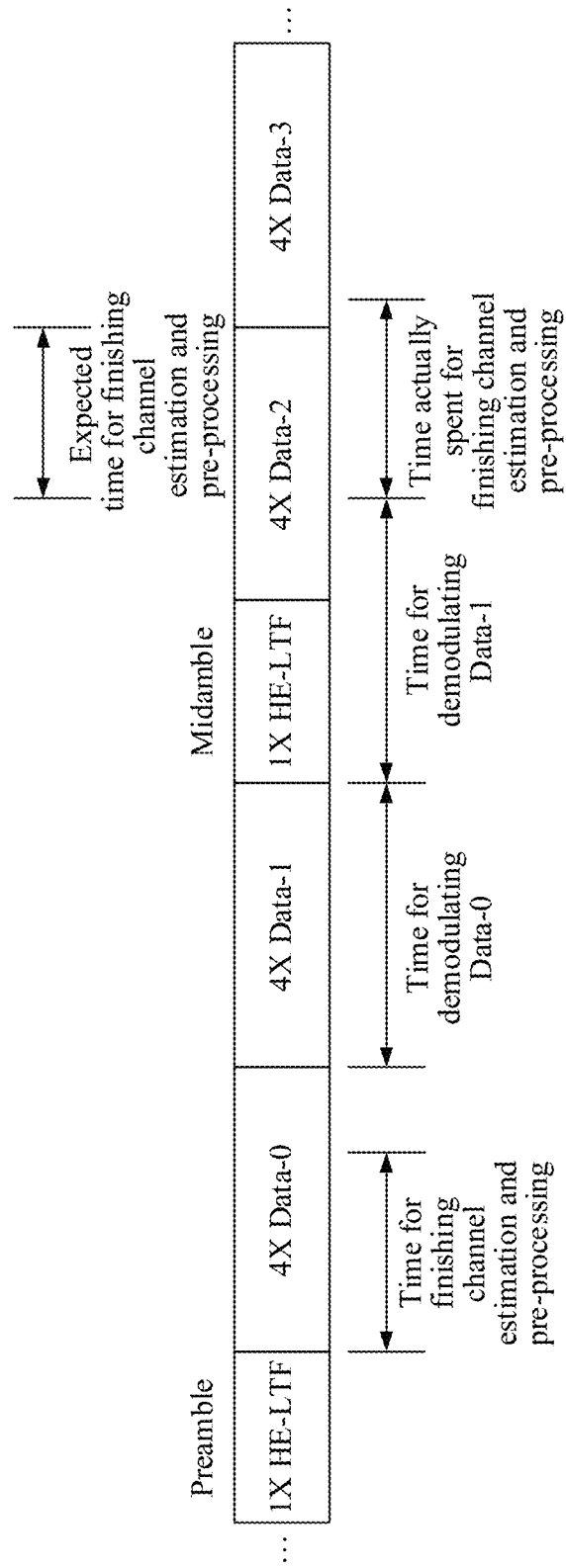
FIG. 1 is a schematic diagram of processing a midamble according to an embodiment of this application.

As shown in FIG. 1, after finishing receiving the midamble, the receiving device should perform a fast Fourier transform (FFT), channel estimation, and pre-processing (for example, preparatory work related to multi-input, multi-output) based on the HE-LTF. After finishing receiving Data-0, the receiving device demodulates Data-0 based on a channel estimation result, after finishing receiving Data-1, the receiving device demodulates Data-1 based on the channel estimation result.

After the data symbol Data-1 with a duration of 4× (12.8 μs), a time of approximately 4× (12.8 μs) is usually needed to demodulate Data-1. After receiving a midamble with a relatively short duration, the receiving device further performs a FFT, channel estimation, and pre-processing (for example, preparatory work related to multi-input, multi-output) based on the received midamble. A procedure in which the receiving device demodulates Data-1 and performs channel estimation should be finished before a moment at which Data-2 is completely received, so that Data-2 can be correctly demodulated. In one example, the receiving device should finish demodulating Data-1 and channel estimation within a total duration of the midamble and Data-2. However, for a receiving device with a relatively weak processing capability, the receiving device may probably have no time, after demodulating Data-1, to finish a process of channel estimation and pre-processing within the total duration of the midamble and Data-2. As shown in FIG. 1, the receiving device finishes the process of channel estimation and pre-processing some time after Data-2 is completely received, which may cause an error in demodulation of Data-2.

To resolve the foregoing problem, this application provides a midamble indication method, to enable a receiving device to correctly decode a received data symbol based on a midamble sent by a first device.

The device described in embodiments of this application includes but is not limited to a communications server, a router, a switch, a bridge, a computer, a mobile phone, an access point (AP), a station (STA), or the like. The device may be a vehicle-mounted communications device, a train relay communications module, a trackside AP, a communications base station, or the like.

Figure 2:
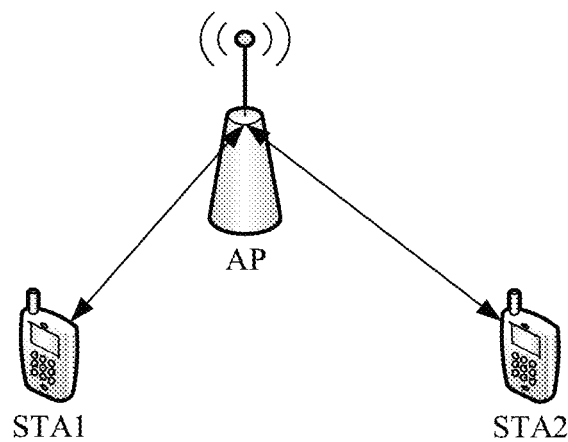
FIG. 2 is a schematic diagram of an application scenario according to an embodiment of this application.

The embodiments of this application may be applied to the application scenario shown in FIG. 2 and used for communication between an AP and a STA, communication between APs, or communication between STAs. Certainly, application scenarios of the embodiments of this application are not limited to the scenario shown in FIG. 2.

When the Doppler mode is enabled, midamble indication information is usually sent before a midamble is sent. The indication information includes at least information used to indicate a duration of the midamble and/or information used to indicate a period of the midamble.

Because content of the midamble is usually the same as content of an HE-LTF in a preamble, in some embodiments, the midamble and the HE-LTF in the preamble may use same duration indication information.

The information used to indicate the duration of the midamble may further include indication information used to indicate a quantity of HE-LTF symbols included in the midamble and indication information used to indicate a duration of an HE-LTF symbol, or indication information used to indicate a quantity of STS used by the midamble and indication information used to indicate an HE-LTF symbol.

For example, an HE-LTF symbol includes a GI part and a non-GI part. The GI is used to avoid interference between symbols and the non-GI part is used to perform FFT, channel estimation and pre-processing.

For example, the duration $T_{Midamble}$ of the midamble may be obtained through Formula (1).

$$T_{Midamble} = N_{HE\text{-}LTF} \times (T_{HE\text{-}LTF} + T_{GI}) \quad (1)$$

$N_{HE\text{-}LTF}$ signifies the quantity of HE-LTF symbols included in the midamble, $T_{HE\text{-}LTF}$ signifies a duration of an HE-LTF symbol excluding a GI part, and $T_{GI}$ signifies a duration of a GI.

Furthermore, when transmitted data is an HE single-user (SU) physical layer protocol data unit (PPDU) or an HE extended-range (ER) SU PPDU, $N_{HE\text{-}LTF}$ is not separately indicated. However, the quantity of STS used by the midamble and the quantity of HE-LTF symbols included in the midamble have a correspondence with each other, as shown in Formula (2).

$$N_{HE\text{-}LTF} = \begin{cases} 1, N_{sts} = 1 \\ 2, N_{sts} = 2 \\ 4, N_{sts} = 3, 4 \end{cases} \quad (2)$$

Therefore, the duration of the midamble may also be determined according to Formula (2), the quantity of STS used by the midamble, the duration of the HE-LTF symbol excluding the GI part, and the duration of the GI.

In one embodiment, when transmitted data is an HE SU PPDU or an HE ER SU PPDU, the midamble indication information may be included in an HE-SIG-A field, as shown in Table 3.

TABLE 3

| Bit | Field | Quantity of bits | Description |
|---|---|---|---|
| B23 to B25 | Quantity of STS and period of the midamble | 3 | When the Doppler mode is disabled, B23 to B25 signify quantities of STS When the Doppler mode is enabled, B23 and B24 signify quantities of STS B25 signifies the period of the midamble Value = 0 signifies sending a midamble after sending every 10 data symbols Value = 1 signifies sending a midamble after sending every 20 data symbols |
| . . . | . . . | . . . | . . . |
| B15 | Doppler mode | 1 | Set to 0, the Doppler mode is disabled; Set to 1, the Doppler mode is enabled |

In another embodiment, when transmitted data is an HE multiple-user (MU) PPDU, the midamble indication information may be included in an HE-SIG-A field, as shown in Table 4.

TABLE 4

| Bit | Field | Quantity of bits | Description |
|---|---|---|---|
| B25 | Doppler mode | 1 | Set to 0, the Doppler mode is disabled; Set to 1, the Doppler mode is enabled |
| . . . | . . . | . . . | . . . |
| B8 to B10 | Quantity of HE-LTF symbols and period of the midamble | 3 | When the Doppler mode is disabled, it signifies the quantity of HE-LTF symbols: Value = 0 signifies one HE-LTF symbol Value = 1 signifies one HE-LTF symbol Value = 2 signifies four HE-LTF symbols Value = 3 signifies six HE-LTF symbols Value = 4 signifies eight HE-LTF symbols Others reserved When the Doppler mode is enabled, B8 and B9 signify the quantity of HE-LTF symbols: |

TABLE 4-continued

| Bit | Field | Quantity of bits | Description |
|---|---|---|---|
| | | | Value = 0 signifies one HE-LTF symbol |
| | | | Value = 1 signifies one HE-LTF symbol |
| | | | Value = 2 signifies four HE-LTF symbols |
| | | | Others reserved |
| | | | B10 signifies the period of the midamble; |
| | | | Value = 0 signifies sending a midamble after sending every 10 data symbols |
| | | | Value = 1 signifies sending a midamble after sending every 20 data symbols |

In another embodiment, for trigger frame-based (TB) transmission of a PPDU (TB PPDU), indication information used to indicate a quantity of HE-LTF symbols included in a midamble and indication information used to indicate a duration of an HE-LTF symbol excluding a GI part and a duration of a GI may be similar to those when data is an HE MU PPDU. The difference is that midamble indication information is carried in a trigger frame sent by an AP to a STA. For example, a field of a quantity of HE-LTF symbols and a midamble period is set in a public domain. When subsequent data transmission is needed, whether an AP sends a data frame to a STA or a STA sends a data frame to an AP, the midamble is sent according to midamble-related indication information included in the trigger frame.

The indication information of the duration of the HE-LTF symbol excluding the GI part and the duration of a GI (for example, signified by GI+LTF) may alternatively be carried in an HE-SIG-A field of a preamble or in a trigger frame. For example, the duration of the HE-LTF symbol excluding the GI part may be 1× (3.2 μs), 2× (6.4 μs), or 4× (12.8 μs), and the duration of the GI may be 0.8 μs, 1.6 μs, or 3.2 μs. Therefore, there are a plurality of combinations of the duration of the HE-LTF symbol excluding the GI part and the duration of the GI, for example, as shown in Table 5.

TABLE 5

| GI + LTF duration period | HE (ER) SU PPDU | HE MU PPDU | TB PPDU |
|---|---|---|---|
| 0 | 1 × HE-LTF + 0.8 μs GI | 4 × HE-LTF + 0.8 μs GI | 1 × HE-LTF + 1.6 μs GI |
| 1 | 2 × HE-LTF + 0.8 μs GI | 2 × HE-LTF + 0.8 μs GI | 2 × HE-LTF + 1.6 μs GI |
| 2 | 2 × HE-LTF + 0.8 μs GI | 2 × HE-LTF + 1.6 μs GI | 4 × HE-LTF + 3.2 μs GI |
| 3 | When both a value of a dual-carrier coded modulation (DCM) field and a value of a space time block code (STBC) are 1: 4 × HE-LTF + 0.8 μs GI; Others: 4 × HE-LTF + 3.2 μs GI | 4 × HE-LTF + 3.2 μs GI | Reserved |

Based on Table 4 and Table 6, when transmitted data is an HE SU PPDU or an HE ER SU PPDU, the duration of the midamble may be shown in Table 6.

TABLE 6

| | $N_{sys}$ | | | |
|---|---|---|---|---|
| GI + LTF | 0 | 1 | 2 | 3 |
| 0 | 4 μs | 8 μs | 16 μs | 16 μs |
| 1 | 7.2 μs | 14.4 μs | 28.8 μs | 28.8 μs |
| 2 | 8 μs | 16 μs | 32 μs | 32 μs |
| 3, both DCM and STBC are 1 | 13.6 μs | 27.2 μs | 54.4 μs | 54.4 μs |
| 3, others | 16 μs | 32 μs | 64 μs | 64 μs |

Based on Table 4 and Table 5, when transmitted data is an HE MU PPDU, the duration of the midamble may be shown in Table 7.

TABLE 7

| | $N_{HE-LTF}$ | | | |
|---|---|---|---|---|
| GI + LTF | 0 | 1 | 2 | 3 |
| 0 | 13.6 μs | 27.2 μs | 54.4 μs | Reserved |
| 1 | 7.2 μs | 14.4 μs | 28.8 μs | Reserved |
| 2 | 8 μs | 16 μs | 32 μs | Reserved |
| 3 | 13.6 μs | 32 μs | 64 μs | Reserved |

Based on Table 4 and Table 5, for a TB PPDU, the duration of the midamble may be shown in Table 8.

TABLE 8

| | $N_{HE-LTF}$ | | | |
|---|---|---|---|---|
| GI + LTF | 0 | 1 | 2 | 3 |
| 0 | 4.8 μs | 9.6 μs | 19.2 μs | Reserved |
| 1 | 8 μs | 16 μs | 32 μs | Reserved |
| 2 | 16 μs | 32 μs | 64 μs | Reserved |
| 3 | Reserved | Reserved | Reserved | Reserved |

As previously described, the data receiving device may have a relatively weak processing capability. If the duration of the midamble is relatively short, the data receiving device may have no time to finish channel estimation based on the midamble and as a result, an error in decoding data symbols after the midamble is caused. Therefore, in a possible implementation, a threshold for the duration of the midamble may be set. In this example, the duration of the midamble indicated by the midamble indication information is greater than or equal to the threshold, so that a decoding error is avoided. For example, this may be shown in Formula (3).

$$T_{Midamble} = N_{HE-LTF} \times (T_{HE-LTF} + T_{GI}) \geq T_m \quad (3)$$

$T_m$ signifies the threshold.

As the duration of the midamble increases, a duration of processing the midamble will not proportionally increase. For example, if the duration of the midamble increases to four times an original duration, the duration of processing the midamble will be less than four times an original processing duration. Therefore, a minimum threshold is set for the duration of the midamble, to help avoid a case in which after receiving the midamble, the data receiving device may have no time to correctly decode a data symbol based on the midamble due to the limited processing capability.

Figure 3:
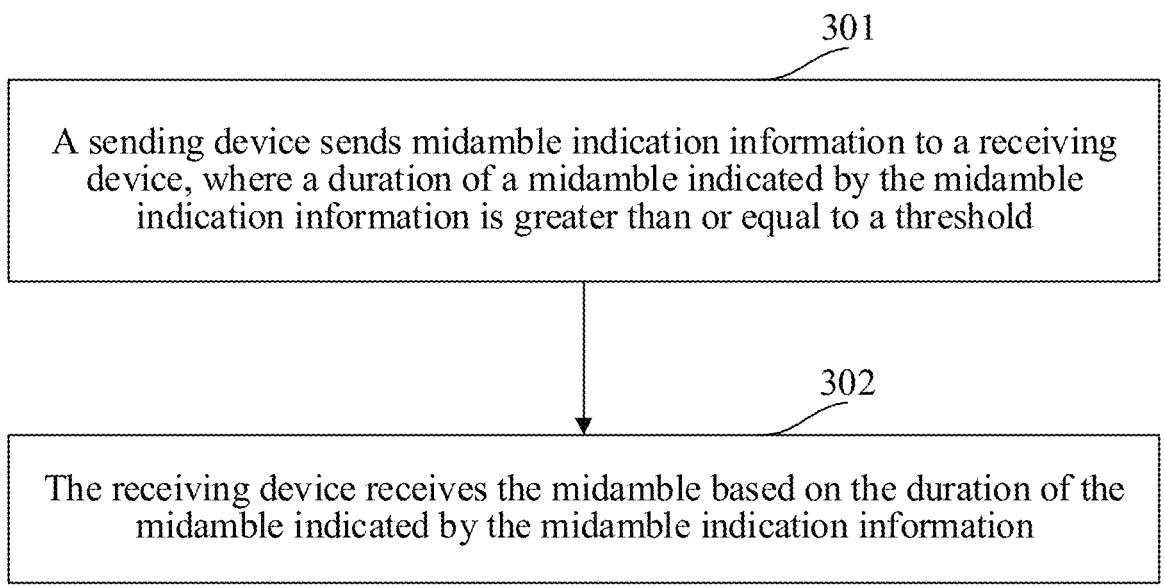
FIG. 3 is a flowchart of midamble indication and receiving procedures according to an embodiment of this application.

For example, when data transmission is performed based on an HE SU PPDU, an HE ER SU PPDU, or an HE MU PPDU, midamble indication and receiving procedures may be shown in FIG. 3.

Step 301. A sending device sends midamble indication information to a receiving device, where a duration of a midamble indicated by the midamble indication information is greater than or equal to a threshold.

When determining to enable a Doppler mode, the sending device may determine the duration of the midamble based on the preset threshold described in the foregoing embodiment, add indication information of the duration of the midamble to an HE-SIG-A, and send the HE-SIG-A to a data receiving device. Further, the sending device generates a midamble based on the duration indicated by the indication information and sends the midamble to the data receiving device.

Step 302. The receiving device receives the midamble based on the duration of the midamble indicated by the midamble indication information.

For example, the receiving device receives the midamble based on the duration indicated by the midamble indication information in the HE-SIG-A. Further, the receiving device performs channel estimation and pre-processing based on the received midamble only when the duration of the midamble is greater than or equal to the threshold, and demodulates data symbols after the midamble based on a channel estimation result.

When data transmission is based on a TB PPDU, a midamble indication information sending device may be an AP. When determining to enable the Doppler mode, the AP may determine the duration of the midamble based on the preset threshold described in the foregoing embodiment, add the indication information of the duration of the midamble to a trigger frame, and send the trigger frame to a STA.

After receiving the midamble indication information, the STA determines the duration of the midamble. When transmitting data to the AP or another STA, the STA may generate a midamble based on the duration indicated by the midamble indication information and send the midamble to the AP or the other STA. Alternatively, the STA may receive, according to the midamble indication information, a midamble sent by the AP or another STA and demodulate data symbols after the midamble based on a channel estimation result.

In an embodiment, the threshold $T_m$ may be pre-agreed. For example, the threshold $T_m$ of the duration of the midamble is specified in a communication protocol, and the duration of the midamble sent by the data sending device should be greater than or equal to the threshold (or should be greater than the threshold). The threshold may be determined by a researcher based on an analysis result obtained through a statistical analysis of midamble processing time of massive devices. For another example, the threshold may be 7.2 μs (2×HE-LTF+0.8 μs GI), 14.4 μs (2×(2×HE-LTF+0.8 μs GI)), or 8 μs (2×HE-LTF+1.6 μs or 2×(1×HE-LTF+0.8 μs GI).

In another embodiment, information about a midamble processing capability of the data receiving device may be obtained in advance and the threshold $T_m$ is determined based on the capability information. Optionally, when accessing an AP, a STA reports information about a midamble processing capability of the STA. Further, the AP may also send capability information of the AP to the STA, so that when data is transmitted between the STA and the AP and the Doppler mode should be enabled, a midamble can be sent based on the processing capability of the data receiving device, thereby avoiding a case in which the receiving device has no time to finish channel estimation based on the midamble and consequently an error occurs when the receiving device decodes data symbols after the midamble. Optionally, for communication between STAs, for example, if a STA 1 sends data to a STA 2 and the Doppler mode should be used in a current environment, the STA 1 may obtain capability information of the STA 2 before sending the data, determine a corresponding threshold based on the capability information of the STA 2, and then send the data based on the capability information of the STA 2. A duration of a midamble that is inserted into data symbols and that is sent is greater than or equal to the threshold. Further, the capability information may be obtained bi-directionally. For example, the STA 1 sends capability information of the STA 1 to the STA 2 and the STA 2 sends the capability information of the STA 2 to the STA 1.

For example, when data transmission is performed based on an HE SU PPDU, an HE ER SU PPDU, or an HE MU PPDU, a midamble indication information sending device may be the data sending device. When determining to enable the Doppler mode, the sending device may determine the duration of the midamble and other information based on the obtained capability information of the receiving device, add the indication information of the duration of the midamble to an HE-SIG-A, and send the HE-SIG-A to the data receiving device, and generate a midamble based on the duration indicated by the indication information and send the midamble to the data receiving device.

The data receiving device may send the information about the midamble processing capability of the data receiving device to the sending device in advance, receive the midamble based on the duration indicated by the midamble indication information in the HE-SIG-A sent by the sending device, perform channel estimation and pre-processing based on the received midamble, and demodulate data symbols after the midamble based on a channel estimation result.

When data transmission is performed based on a TB PPDU, a midamble indication information sending device may be an AP. When determining to enable the Doppler mode, the AP may determine the duration of the midamble and other information based on information about a midamble processing capability of a STA, add the indication information of the duration of the midamble to a trigger frame, and send the trigger frame to the STA.

After receiving the midamble indication information, the STA determines the duration of the midamble. When transmitting data to the AP or another STA, the STA may generate a midamble based on the duration indicated by the midamble indication information and send the midamble to the AP or the other STA. Alternatively, the STA may receive, according to the midamble indication information, a midamble sent by the AP or another STA and demodulate data symbols after the midamble based on a channel estimation result.

Optionally, the information about the midamble processing capability of the data receiving device may include a minimum threshold of a duration of a midamble that can be processed. In this case, the data sending device or the AP sending the trigger frame may determine, based on the minimum threshold, the duration of the midamble indicated by the sent midamble indication information.

A duration and complexity of processing a midamble are related to configurations of the midamble. Therefore, in some embodiments, the obtained information about the midamble processing capability of the data receiving device may further include configuration information of a midamble that can be supported by the receiving device. For example, the duration of processing the midamble is related to configurations such as a quantity of resource units (RU) occupied by the midamble (namely, a quantity of occupied subcarriers), a quantity ($N_{sts}$) of STS, and a MCS. If any two configuration parameters among the quantity of RUs, $N_{sts}$, and the MCS are constant and the other configuration parameter increases, a processing duration increases correspondingly, or if any two configuration parameters among the quantity of RUs, $N_{sts}$, and the MCS are constant and the other configuration parameter decreases, then a processing duration decreases correspondingly. Therefore, the capability information of the data receiving device may include one of the following information or a combination thereof a maximum quantity of RUs that can be supported, maximum $N_{sts}$ that can be supported, and information about an MCS that can be supported when the midamble occupies L RUs and K $N_{sts}$, where both L and K are integers greater than or equal to 1.

Further, the capability information of the receiving device may include both the minimum threshold and the configuration information of the midamble. The minimum threshold signifies that regardless of configuration information of the midamble, the midamble can meet a threshold of the processing capability of the receiving device. A device determining midamble indication information may determine, for the receiving device, a duration of a corresponding midamble directly based on the minimum threshold, or may determine, according to an application and regardless of the minimum threshold, a configuration of a corresponding midamble based on configuration information of the midamble that can be supported, so that the receiving device can process the midamble in a timely manner and demodulation of subsequent data symbols is not affected. For example, if the quantity of RUs, $N_{sts}$, and the MCS configured for the midamble enable the receiving device to perform normal processing regardless of the duration of the midamble, the minimum threshold may not be considered. For example, when a midamble including only one 1× HE-LTF is used, the receiving device can still perform processing in a timely manner. If the quantity of RUs, $N_{sts}$, and the MCS configured for the midamble do not ensure that the receiving device can perform normal processing regardless of the duration of the midamble, the minimum threshold of the duration of the midamble should be considered.

Furthermore, the capability information may further include support information of the receiving device for a Doppler mode. For example, the capability information may include two bits, where one bit is used to indicate whether a Doppler mode based on an HE SU PPDU or an HE ER SU PPDU is supported and the other bit is used to indicate whether a Doppler mode based on an MU PPDU or a TB PPDU is supported. Alternatively, the capability information may include four bits, where one bit is used to indicate whether data receiving in a Doppler mode based on an HE SU PPDU or an HE ER SU PPDU is supported, one bit is used to indicate whether data sending in a Doppler mode based on an HE SU PPDU or an HE ER SU PPDU is supported, one bit is used to indicate whether data receiving in a Doppler mode based on an HE MU PPDU or a TB PPDU is supported, and one bit is used to indicate whether data sending in a Doppler mode based on an MU PPDU or a TB PPDU is supported. Alternatively, an HE SU PPDU may be separately used as a group, and an HE ER SU PPDU, an MU PPDU, and a TB PPDU are used as a group. Four bits may also be used to indicate whether these two groups support receiving and sending in a Doppler mode. Alternatively, receiving complexity in the Doppler mode for different data groups may be different, and consequently, data of one STA should be carried on more symbols during multi-user transmission (namely, an HE MU PPDU or a TB PPDU), and performance is affected. Therefore, a separate indication is useful.

Figure 4:
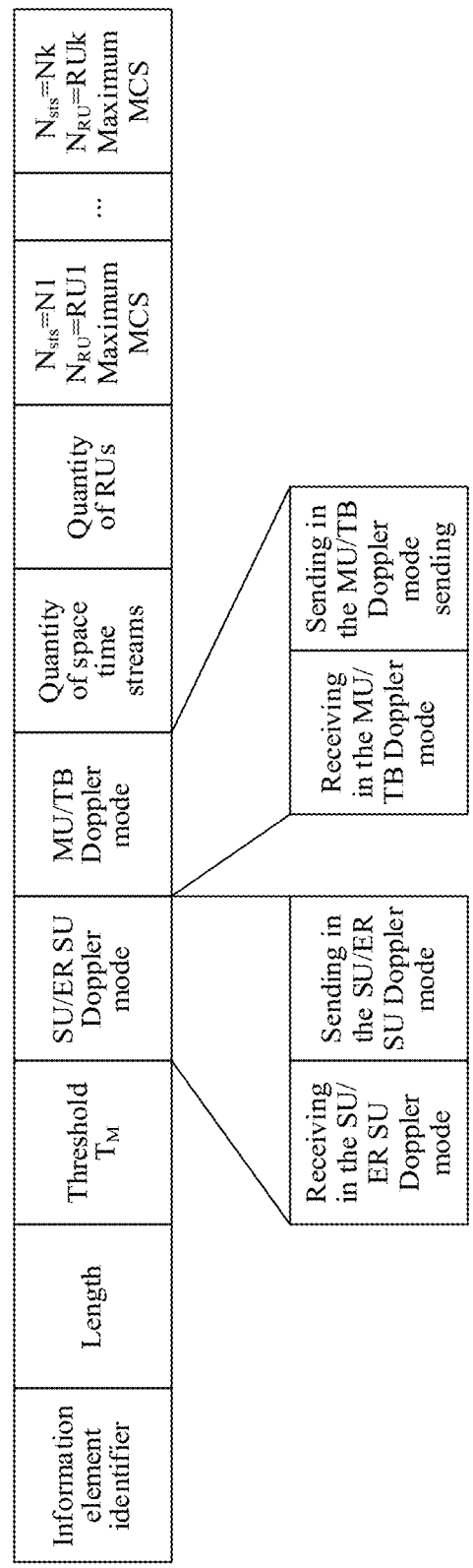
FIG. 4 is a schematic diagram of capability information according to an embodiment of this application.

In an embodiment, the capability information sent by the data receiving device may be shown in FIG. 4, and includes an information element identifier, signifying that the information is used to indicate information related to the midamble processing capability, a length, used to indicate a length of the information, a threshold $T_M$, used to signify that if the duration of the midamble is greater than or equal to the threshold, the data receiving device can perform normal processing, an SU/ER SU Doppler mode, which signifies whether the device supports an SU/ER SU-based Doppler mode and may further include whether the device supports receiving and sending in the SU/ER SU-based Doppler mode, an MU/TB Doppler mode, which signifies whether the device supports an MU/TB-based Doppler mode and may further include whether the device supports receiving and sending in the MU/TB-based Doppler mode, a quantity of STS, signifying a maximum quantity of STS occupied by a midamble that can be processed by the device, a quantity of RUs, signifying a maximum quantity of RUs occupied by a midamble that can be processed by the device, a maximum value of an MCS that can be supported by the device when $N_{sts}$=N1 and $N_{RU}$=RU1, and a maximum value of an MCS that can be supported by the device when $N_{sts}$=$N_k$ and $N_{RU}$=$RU_k$.

In a possible implementation, the duration of each HE-LTF symbol, included in the midamble indicated by the midamble indication information, excluding a GI part may be limited. For example, a duration of an HE-LTF symbol excluding a GI part in the midamble may be limited to 2× or 4×, to satisfy most devices for processing a midamble. As shown in Table 6 to Table 8, when a duration of an HE-LTF symbol excluding a GI part is 2× or 4× (that is, when a GI+LTF duration field is 1, 2 or 3), corresponding midamble durations are all greater than or equal to 7.2 µs. Alternatively, a duration of an HE-LTF symbol excluding a GI part in the midamble may be limited only to 4X. As shown in Table 6 to Table 8, when a duration of an HE-LTF symbol excluding a GI part is 4× (that is, when a GI+LTF duration field is 3), corresponding midamble durations are all greater than or equal to 13.6 µs.

In a possible implementation, the duration of the midamble indicated by the midamble indication information belongs to a midamble duration set.

Optionally, the midamble duration set include only one of the following or any combination thereof a duration of an HE-LTF symbol excluding a GI part being 4× and a duration of a GI being 0.8 µs, a duration of an HE-LTF symbol excluding a GI part being 4× and a duration of a GI being 1.6 µs, a duration of an HE-LTF symbol excluding a GI part being 4× and a duration of a GI being 3.2 µs, a duration of an HE-LTF symbol excluding a GI part being 2× and a duration of a GI being 0.8 µs, a duration of an HE-LTF symbol excluding a GI part being 2× and a duration of a GI being 1.6 µs, and a duration of an HE-LTF symbol excluding a GI part being 2× and a duration of a GI being 3.2 µs.

Further, the data receiving device performs channel estimation and pre-processing based on the received midamble only when a duration of an HE-LTF symbol included in the midamble belongs to an available set.

In an embodiment, when transmitted data is an HE SU PPDU or an HE ER SU PPDU, a GI+LTF related field carried in an HE-SIG-A in a preamble may be shown in Table 9.

TABLE 9

| Bit | Field | Description |
|---|---|---|
| B21 and B22 | GI + LTF | When the Doppler mode is disabled:<br>Value = 0 signifies 1 × HE-LTF + 0.8 µs GI;<br>Value = 1 signifies 2 × HE-LTF + 0.8 µs GI;<br>Value = 2 signifies 2 × HE-LTF + 1.6 µs GI;<br>Value = 3:<br>When both a value of a DCM and a value of an STBC are 1: 4 × HE-LTF + 0.8 µs GI;<br>Others: 4 × HE-LTF + 3.2 µs GI<br>When the Doppler mode is enabled:<br>Value = 3:<br>When both a value of a DCM and a value of an STBC are 1: 4 × HE-LTF + 0.8 µs GI;<br>Others: 4 × HE-LTF + 3.2 µs GI<br>Value = 0, 1, 2 reserved |

In an embodiment, when transmitted data is an HE MU PPDU, a GI+LTF related field carried in an HE-SIG-A in a preamble may be shown in Table 10.

TABLE 10

| Bit | Field | Description |
|---|---|---|
| B22 and B23 | GI + LTF | When the Doppler mode is disabled:<br>Value = 0 signifies 4 × HE-LTF + 0.8 µs GI;<br>Value = 1 signifies 2 × HE-LTF + 0.8 µs GI;<br>Value = 2 signifies 2 × HE-LTF + 1.6 µs GI;<br>Value = 3 signifies 4 × HE-LTF + 3.2 µs GI;<br>When the Doppler mode is enabled:<br>Value = 0 signifies 4 × HE-LTF + 0.8 µs GI;<br>Value = 3 signifies 4 × HE-LTF + 3.2 µs GI;<br>Value = 0, 1, 2 reserved |

In an embodiment, for a TB PPDU, a GI+LTF related field carried in a trigger frame may be shown in Table 11.

TABLE 11

| Value | Description |
|---|---|
| 0 | When the Doppler mode is disabled:<br>signifies 1 × HE-LTF + 1.6 µs GI;<br>When the Doppler mode is enabled: reserved |
| 1 | When the Doppler mode is disabled:<br>signifies 2 × HE-LTF + 1.6 µs GI;<br>When the Doppler mode is enabled: reserved |
| 2 | 4 × HE-LTF + 3.2 µs GI; |
| 3 | Reserved |

Optionally, the threshold described in any one of the foregoing embodiments may be valid only when a quantity of STS occupied by the midamble is greater than or equal to 2. For example, when the midamble occupies only one STS, whether the duration of the midamble is greater than or equal to the threshold may not be considered. Because when the midamble occupies only one STS, complexity of processing the midamble is relatively low for the data receiving device. In this case, even if the duration of the midamble is relatively short, the receiving device can still finish the process of performing channel estimation based on the midamble in a timely manner. When the quantity of STS occupied by the midamble is greater than or equal to 2, the complexity of processing the midamble increases for the receiving device and a threshold of the midamble should be set such that the receiving device can successfully finish channel estimation based on the midamble without affecting decoding of data symbols after the midamble.

For example, the duration of the midamble may be shown in Formula (4).

$$T_{Midamble}=N_{HE-LTF}\times(T_{HE-LTF}+T_{GI})\ge T_M,N_{sts}\ge 2 \quad (4)$$

In an embodiment, when a quantity of STS is greater than or equal to 2, a duration of an HE-LTF symbol excluding a GI part should be 4×. Alternatively, when a quantity of STS is greater than or equal to 2, a duration of an HE-LTF symbol excluding a GI part should be 2× or 4×.

When the Doppler mode is enabled, because content of the midamble is the same as content of the HE-LTF in the preamble, the midamble and the HE-LTF in the preamble may use same duration indication information. However, in some scenarios, the content of the midamble is different from the content of the HE-LTF in the preamble, or the duration of the midamble should be increased due to the fact that the receiving device has different specifications for the duration of the midamble and the duration of the HE-LTF in the preamble. Therefore, in a possible implementation, different indication information may be used to indicate the duration of the midamble and the duration of the HE-LTF in the preamble.

For example, when data transmission is performed based on an HE SU PPDU, an HE ER SU PPDU or an HE MU PPDU, a midamble indication information sending device may be the data sending device. When determining to enable the Doppler mode, the sending device may separately determine indication information of the HE-LTF in the preamble and indication information of the midamble, add the indication information to an HE-SIG-A and send the HE-SIG-A to the data receiving device, and generate a midamble based on midamble information indicated by the indication information and send the midamble to the data receiving device.

The data receiving device separately receives the indication information of the HE-LTF in the preamble and the indication information of the midamble, separately determines relevant information of the HE-LTF in the preamble and relevant information of the midamble, receives the HE-LTF in the preamble and the midamble based on the relevant information, performs channel estimation and preprocessing based on the received HE-LTF in the preamble and the received midamble, and demodulates data symbols after the midamble based on a channel estimation result.

When data transmission is performed based on a TB PPDU, a midamble indication information sending device may be the AP. When determining to enable the Doppler mode, the AP may separately determine indication information of the HE-LTF in the preamble and indication information of the midamble, add the indication information to a trigger frame, and send the trigger frame to the STA.

After receiving the indication information of the HE-LTF in the preamble and the indication information of the midamble, the STA separately determines preamble information and midamble information. When transmitting data to the AP or another STA, the STA may generate a preamble and a midamble based on the preamble information and the midamble information and send the preamble and the midamble to the AP or the other STA.

Optionally, different indication information is used to indicate a duration of an HE-LTF symbol excluding a GI part and a duration of a GI included in the midamble and a duration of an HE-LTF symbol excluding a GI part and a duration of a GI included in the HE-LTF in the preamble.

To avoid increasing signaling overheads, some reserved bits or reserved entries in a data frame may be used to indicate midamble information.

For example, there are some reserved entries in an SRP field of an HE-SIG-A field, as shown in Table 12.

TABLE 12

| Value | Description |
|---|---|
| 0 | SR transmission based on a spatial reuse parameter is prohibited |
| 1-12 | Reserved |
| 13 | SR transmission is limited |
| 14 | SR transmission is delayed |
| 15 | Identification of an overlapping basic service set with a non-SR group and a data packet is prohibited |

The SR field has four bits and can provide 16 entries, as shown in Table 12. Entries with values of 1 to 12 in the SR are reserved. Therefore, some or all of these 12 reserved entries may be used to indicate the duration of each HE-LTF symbol excluding the GI part and/or the duration of each GI included in the midamble and the duration of each HE-LTF symbol excluding the GI part and/or the duration of each GI included in the HE-LTF in the preamble. For example, reserved entries in the SR field are defined as shown in Table 13.

TABLE 13

| Value | SU/ER SU PPDU | MU PPDU |
|---|---|---|
| 1 | 1 × HE-LTF + 0.8 μs GI | 4 × HE-LTF + 0.8 μs GI |
| 2 | 2 × HE-LTF + 0.8 μs GI | 2 × HE-LTF + 0.8 μs GI |
| 3 | 2 × HE-LTF + 1.6 μs GI | 2 × HE-LTF + 1.6 μs GI |
| 4 | When both a value of a DCM field and a value of an STBC field are 1: 4 × HE-LTF + 0.8 μs GI; Others: 4 × RE-LTF + 3.2 μs GI | 4 × HE-LTF + 3.2 μs GI |
| 5-12 | Reserved | Reserved |

In some other embodiments, the duration of each GI included in the midamble and the duration of each GI included in the HE-LTF in the preamble may be made the same, and only the duration of each HE-LTF symbol excluding the GI part included in the midamble and the duration of each HE-LTF symbol excluding the GI part included in the HE-LTF in the preamble are separately indicated. For example, the entries in Table 13 correspond only to durations of the HE-LTF symbol excluding the GI part that are 1×, 2× or 4×.

Furthermore, in addition to using reserved entries in the SRP field to indicate the duration of the HE-LTF symbol excluding the GI part and/or the duration of a GI included in the midamble, a reserved bit in an HE-SIG-A field or a trigger frame may also be used to indicate the duration of the HE-LTF symbol and/or the duration of the GI included in the midamble. For example, when transmitted data is an HE SU PPDU or an HE ER SU PPDU, there are two reserved bits in the HE-SIG-A field, when transmitted data is an HE MU PPDU, there is one reserved bit in the HE-SIG-A field. There are also some reserved bits in the trigger frame, and some of the reserved bits are referred to as HE-SIG-A Reserved, because these reserved bits correspond to reserved bits in an HE-SIG-A field in a data frame during subsequent transmission.

In an embodiment, a reserved bit in an HE-SIG-A field in a data frame or a trigger frame may be defined as shown in Table 14.

TABLE 14

| Value of a reserved bit | SU/ER SU PPDU | MU PPDU | TB PPDU |
|---|---|---|---|
| 0 | 4 × HE-LTF same as a duration of an HE-LTF symbol excluding a GI part in a preamble | 4 × HE-LTF same as a duration of an HE-LTF symbol excluding a GI part in a preamble | 4 × HE-LTF same as a duration of an HE-LTF symbol excluding a GI part in a preamble |
| 1 | | | |

As shown in Table 14, only a duration of an HE-LTF symbol excluding a GI part included in the midamble is defined. A duration of a GI included in the midamble is the same as a duration of a GI in the preamble. Furthermore, in some approaches, these reserved bits are usually default values or are set to 1. Therefore, in Table 14, a reserved bit being set to 1 signifies that the duration of the midamble is the same as the duration of the HE-LTF in the preamble, so that it is convenient for the receiving device to identify. Certainly, corresponding definitions of a reserved bit being set to 0 and a reserved bit being set to 1 may be interchanged, which is not limited in this application.

In another embodiment, two reserved bits in an HE-SIG-A field in a data frame or in a trigger frame may be defined as shown in Table 15.

TABLE 15

| Value of a reserved bit | SU/ER SU PPDU | TB PPDU |
|---|---|---|
| 1 | 1 × HE-LTF + 0.8 μs GI | 4 × HE-LTF + 0.8 μs GI |
| 2 | 2 × HE-LTF + 0.8 μs GI | 2 × HE-LTF + 0.8 μs GI |
| 3 | 2 × HE-LTF + 1.6 us GI | 2 × HE-LTF + 1.6 μs GI |
| 4 | When both a value of a DCM field and a value of an STBC field are 1: 4 × HE-LTF + 0.8 μs GI; Others: 4 × HE-LTF + 3.2 μs GI | 4 × HE-LTF + 3.2 μs GI |

Information about the duration of the midamble and information about the duration of the HE-LTF in the preamble are separately indicated, and therefore, limitation on the duration of the midamble does not affect the HE-LTF in the preamble. For example, the HE-LTF in the preamble may use an HE-LTF symbol excluding a GI part and with a relatively short duration or a GI with a relatively short duration, while it indicates that the midamble uses an HE-LTF symbol excluding a GI part and with a relatively long duration or a GI with a relatively long duration, thereby helping reduce signaling overheads of the preamble. Alternatively, because information about the duration of the midamble and information about the duration of the HE-LTF in the preamble are separately indicated, the HE-LTF in the preamble may use an HE-LTF symbol excluding a GI part and with a relatively long duration or a GI with a relatively long duration, or use a relatively large quantity of HE-LTF symbols, to make initialization of channel estimation more accurate, while the midamble uses an HE-LTF symbol excluding a GI part and with a relatively short duration or uses a relatively small quantity of HE-LTF symbols. The data receiving device performs weighted averaging based on a channel estimation result received based on the midamble and an initial channel estimation result, to improve accuracy of the channel estimation, and help reduce signaling overheads of the midamble.

Furthermore, so that the duration of the midamble can meet a duration of the data receiving device for processing the midamble, a midamble that does not meet the duration may be padded, so that a duration of the midamble after padding is sufficient for processing. For example, padding of the midamble may be duplicating an original midamble. For example, the original midamble includes an HE-LTF symbol with a duration of 2X and excluding a GI part and a GI with a duration of 0.8 μs, and the midamble after padding includes two HE-LTF symbols with a duration of 2X and excluding a GI part and two GIs with a duration of 0.8 μs. Alternatively, as specified in a communication protocol, some irrelevant bits may be added at an appointed position to increase the duration of the midamble. Alternatively, indication information used to indicate a start position of useful information in the midamble may be added to the midamble indication information, so that the data receiving device can obtain the useful information from the midamble after padding to perform channel estimation.

In an embodiment, the reserved bits or reserved entries described above may be used to signify whether the midamble is padded. The duration of the midamble after padding is N times a duration of the original midamble. N is a value greater than 1. For example, N may be 2, 3, or 4. Optionally, the value of N may be specified in a standard, or the data receiving device may be notified of the value of N by using the midamble indication information.

Figure 5:
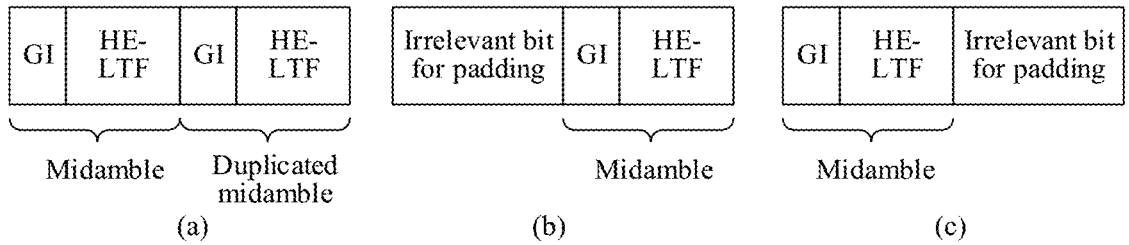
FIG. 5 is a schematic diagram of padding a midamble according to an embodiment of this application.

Using an example in which N is equal to 2, the midamble after padding may be shown in FIG. 5. A situation (a) shown in FIG. 5 signifies that the midamble after padding is obtained by duplicating the original midamble. A situation (b) shown in FIG. 5 signifies that the midamble after padding is obtained by adding an irrelevant bit to the original midamble and a padding position is before the useful information. A situation (c) shown in FIG. 5 signifies that the midamble after padding is obtained by adding an irrelevant bit to the original midamble and a padding position is after the useful information.

Correspondingly, the data receiving device determines, according to the midamble indication information, that the data sending device duplicates the original midamble, and then, after receiving the midamble after padding, the data receiving device may delete duplicated information according to a specification in a standard or according to the midamble indication information, and perform channel estimation based on a midamble after deletion. Alternatively, the data receiving device determines, according to the midamble indication information, that the data sending device adds an irrelevant bit to the original midamble, and then, after receiving the midamble after padding, the data receiving device selects useful information according to a specification in a standard or according to the midamble indication information, and performs channel estimation.

A current standard provides two types of midamble sending periods, signified by one bit. As shown in Table 3 and Table 4, a midamble may be sent after every 10 or 20 data symbols are sent. These two midamble sending periods can cope with the Doppler effect caused when a device is moving at a relatively low speed. However, when a device is moving at a relatively high speed, for example, on a train traveling at a high speed, the Doppler effect is more severe, which causes a channel state to change extremely fast, and therefore a channel estimation result should be updated in a shorter period, to correctly decode a data symbol.

To resolve the foregoing problem, in a possible implementation, a plurality of bits is used to signify midamble sending periods, to provide a plurality of types of midamble sending periods to satisfy channel estimation of different levels of the Doppler effect. Optionally, a period field in the midamble indication information occupies at least two bits and is used to indicate one of at least three preset midamble periods.

For example, as described above, there are some reserved bits or reserved entries in an HE-SIG-A field or a trigger frame. These reserved bits or reserved entries may be used to provide more midamble sending periods.

In an embodiment, a reserved bit may be used in combination with an original bit used to indicate a midamble sending period, as shown in Table 16.

TABLE 16

| Original bit used to indicate a midamble sending period | Added bit | Midamble sending period |
| --- | --- | --- |
| 0 | 0 | two data symbols |
| 1 | 0 | five data symbols |
| 0 | 1 | 10 data symbols |
| 1 | 1 | 20 data symbols |

In another embodiment, a reserved entry in the SRP field may be used to indicate a midamble sending period, as shown in Table 17.

TABLE 17

| Value | Midamble sending period |
| --- | --- |
| 5 | two data symbols |
| 6 | five data symbols |
| 7 | 10 data symbols |
| 8 | 20 data symbols |

Alternatively, an original bit used to indicate a midamble sending period may be retained and combined with a reserved entry in the SRP field to indicate a midamble sending period. Examples are not listed herein one by one.

Furthermore, a reserved entry in the HE-SIG-A field may be used to provide a plurality of types of midamble sending periods.

In another embodiment, a midamble sending period may alternatively be determined by parameters related to a duration for processing the midamble, such as an MCS and $N_{sts}$.

For example, a midamble sending period may be collectively determined by an original bit used to indicate the midamble sending period and an MCS configuration, as shown in Table 18.

TABLE 18

| Original bit used to indicate a midamble sending period | MCS | Midamble sending period |
| --- | --- | --- |
| 0 | Greater than or equal to 4 | two data symbols |
| 1 | Greater than or equal to 4 | five data symbols |
| 0 | Less than or equal to 4 | 10 data symbols |
| 1 | Less than or equal to 4 | 20 data symbols |

For another example, a midamble sending period may alternatively be collectively determined by an original bit used to indicate a midamble sending period and a configuration of Nsts, as shown in Table 19.

TABLE 19

| Original bit used to indicate a midamble sending period | $N_{sts}$ | Midamble sending period |
|---|---|---|
| 0 | 2 or 3 | two data symbols |
| 1 | 2 or 3 | five data symbols |
| 0 | 0 or 1 | 10 data symbols |
| 1 | 0 or 1 | 20 data symbols |

Furthermore, if a midamble period is relatively short, a processing capability of the data receiving device is relatively higher. The data receiving device may not support the relatively short midamble period. Further, information about a midamble processing capability of the data receiving device may further include information about whether an extended midamble period is supported.

It should be understood that the four candidate midamble sending periods in the foregoing embodiments are certain examples for description. A quantity of symbols included in one period and a quantity of candidate periods are not limited in this application.

Any one of the foregoing embodiments can be independently applied to a scenario in which a midamble should be sent when the Doppler effect is enabled. Alternatively, any combination of the foregoing embodiments may be used for midambles in different scenarios.

When data transmission is performed based on an HE SU PPDU, an HE ER SU PPDU or an HE MU PPDU, a midamble indication information sending device may be the data sending device. When determining to enable the Doppler mode, the sending device may determine, based on the information about the midamble described in any one of the foregoing embodiments, the midamble indication information such as a quantity of HE-LTF symbols included in the midamble, a quantity of STS, a duration of an HE-LTF symbol, and a midamble period, add the indication information to an HE-SIG-A and send the HE-SIG-A to the data receiving device, and generate a midamble as indicated by the indication information and send the midamble to the data receiving device.

The data receiving device receives the midamble according to the midamble indication information in the HE-SIG-A, performs channel estimation and pre-processing based on the received midamble, and demodulates data symbols after the midamble based on a channel estimation result.

When data transmission is performed based on a TB PPDU, a midamble indication information sending device may be the AP. When determining to enable the Doppler mode, the AP may determine the midamble indication information based on the information about the midamble described in any one of the foregoing embodiments, add the indication information into a trigger frame, and send the trigger frame to the STA.

After receiving the midamble indication information, when transmitting data to the AP or another STA, the STA may generate a midamble according to the midamble indication information, and send the midamble to the AP or the other STA. Alternatively, the STA may receive, according to the midamble indication information, a midamble sent by the AP or another STA and demodulate data symbols after the midamble based on a channel estimation result.

To resolve a problem that the data receiving device has no time to finish the process of channel estimation based on the midamble due to a limited capability and consequently an error occurs during data decoding, the embodiments of this application further provide a method in which a sending position of the midamble is changed instead of extending the duration of the midamble.

Using an example in which the midamble period is 10 data symbols, the data receiving device performs channel estimation based on the HE-LTF in the preamble, demodulates Data_1 to Data_10 based on a channel estimation result, receives the midamble and re-performs channel estimation, and demodulates Data_11 to Data_20 based on a channel estimation result. If there are more data symbols, the process is repeated, which is not described in detail herein again. If the midamble period is relatively short, the data receiving device may have no time to obtain a channel estimation result based on the midamble, which may cause an error in demodulating Data_11 or more data symbols.

Therefore, the embodiments of this application provide a method to resolve the foregoing problem. In the method, the midamble indication information is used to indicate that in the Doppler mode, after the midamble is received, channel estimation is performed based on the midamble, and an $(X+1)^{th}$ to $(X+M)^{th}$ data symbols after the midamble are demodulated based on a channel estimation result. M signifies the midamble period, and X is an integer specified in a standard or determined based on the midamble processing capability of the data receiving device and greater than or equal to 1. If a value of X is not specified in a standard, the reserved bit or the reserved entry described above may be used to instruct the data receiving device.

Figure 6:
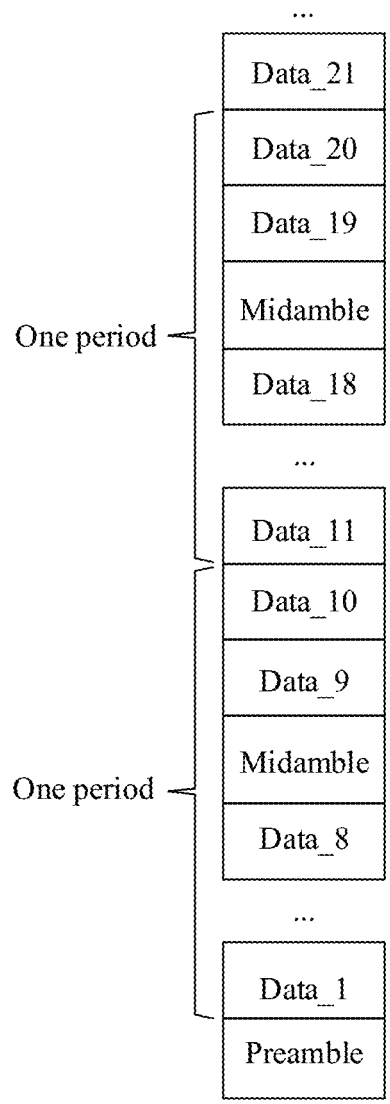
FIG. 6 is a schematic diagram of a sending position of a midamble according to an embodiment of this application.

Still, using an example in which the midamble period is 10 data symbols and X is equal to 2, as shown in FIG. 6, the data sending device first sends Data_1 to Data_8, and then the midamble, Data_9 to Data_18, another midamble, and Data_19 and Data_20. If there are more data symbols, the process is repeated, which is not described in detail herein again.

The data receiving device performs channel estimation based on the HE-LTF in the preamble to obtain a channel estimation result 1, and demodulates Data_1 to Data_8 based on the channel estimation result 1. Then the data receiving device re-performs channel estimation based on the received midamble and obtains a channel estimation result 2. Even if the process of channel estimation is not finished before receiving of Data_9 is finished, demodulation of Data_9 is not affected, because Data_9 and Data_10 are demodulated still based on the channel estimation result 1. Then Data_11 to Data_18 are demodulated based on the channel estimation result 2. The data receiving device receives another midamble, re-performs channel estimation and obtains a channel estimation result 3. Data_19 and Data_20 are demodulated still based on the channel estimation result 2. Then Data_21 and the like are demodulated based on the channel estimation result 3.

Still, using an example in which the midamble period is 10 data symbols and X is equal to 2, in some embodiments, if the data receiving device finishes the process of channel estimation before finishing receiving of Data_10, the data receiving device may also demodulate Data_10 based on a newly obtained channel estimation result, to fully utilize the newly obtained channel estimation result and improve accuracy of data demodulation.

In some embodiments, the method in which the sending position of the midamble is changed may further be combined with the foregoing embodiments in which a plurality of types of midamble periods are provided, for channel estimation at different levels of the Doppler effect.

Because the sending position of the midamble is changed, a buffer time is provided for the data receiving device to perform channel estimation, which helps avoid a case in which after receiving the midamble, the receiving device may have no time to correctly decode a data symbol based on the midamble due to a limited processing capability.

Figure 7:
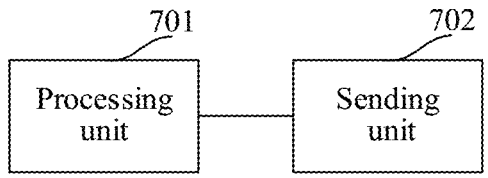
FIG. 7 is a first schematic structural diagram of a device according to an embodiment of this application.

Based on the same technical idea, an embodiment of this application further provides a device. The device may be used as a first device and configured to implement the foregoing method embodiments. Referring to FIG. 7, the device includes a processing unit 701 configured to determine midamble indication information, where a duration of an HE-LTF symbol included in a midamble indicated by the midamble indication information belongs to an available set, and a sending unit 702 configured to send the midamble indication information to a second device.

In a possible implementation, the available set includes one of the following or any combination thereof: the duration of the HE-LTF symbol excluding a GI part being four basic symbol durations and a duration of a GI being 0.8 µs, the duration of the HE-LTF symbol excluding a GI part being four basic symbol durations and a duration of a GI being 1.6 µs, the duration of the HE-LTF symbol excluding a GI part being four basic symbol durations and a duration of a GI being 3.2 µs, the duration of the HE-LTF symbol excluding a GI part being two basic symbol durations and a duration of a GI being 0.8 µs, the duration of the HE-LTF symbol excluding a GI part being two basic symbol durations and a duration of a GI being 1.6 µs, and the duration of the HE-LTF symbol excluding a GI part being two basic symbol durations and a duration of a GI being 3.2 µs.

Figure 8:
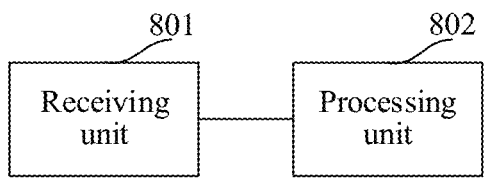
FIG. 8 is a second schematic structural diagram of a device according to an embodiment of this application.

Based on the same technical idea, an embodiment of this application further provides a device. The device may be used as a second device and configured to implement the foregoing method embodiments. Referring to FIG. 8, the device includes a receiving unit 801 configured to receive midamble indication information sent by a first device, and a processing unit 802 configured to perform channel estimation based on a received midamble only when a duration of an HE-LTF symbol included in a midamble indicated by the midamble indication information belongs to an available set.

In a possible implementation, the available set includes one of the following or any combination thereof: the duration of the HE-LTF symbol excluding a GI part being four basic symbol durations and a duration of a GI being 0.8 µs, the duration of the HE-LTF symbol excluding a GI part being four basic symbol durations and a duration of a GI being 1.6 µs, the duration of the HE-LTF symbol excluding a GI part being four basic symbol durations and a duration of a GI being 3.2 µs, the duration of the HE-LTF symbol excluding a GI part being two basic symbol durations and a duration of a GI being 0.8 µs, the duration of the HE-LTF symbol excluding a GI part being two basic symbol durations and a duration of a GI being 1.6 µs, and the duration of the HE-LTF symbol excluding a GI part being two basic symbol durations and a duration of a GI being 3.2 µs.

Based on the same technical idea, an embodiment of this application further provides a device. The device may be used as a first device and configured to implement the foregoing method embodiments. The device includes a processing unit configured to determine midamble indication information, where a duration of a midamble indicated by the midamble indication information is greater than or equal to a threshold, and the threshold is related to a processing capability of a second device, and a sending unit configured to send the midamble indication information to the second device.

A schematic diagram of a connection between the processing unit and the sending unit is similar to FIG. 7.

In a possible implementation, the midamble indication information includes indication information used to indicate a quantity of HE-LTF symbols included in the midamble, and indication information used to indicate a duration of an HE-LTF symbol, where a product of the duration of the HE-LTF symbol and the quantity of HE-LTF symbols is greater than or equal to the preset threshold, or indication information of the duration of the midamble, including indication information used to indicate a quantity of STS used by the midamble, and indication information used to indicate a duration of an HE-LTF symbol, where a product of the duration of the HE-LTF symbol and a quantity of HE-LTF symbols corresponding to the STS is greater than or equal to the preset threshold.

In a possible implementation, the midamble indication information includes at least indication information used to indicate a duration of an HE-LTF symbol excluding a GI part and a duration of a GI. The duration of the HE-LTF symbol excluding the GI part is two or four basic symbol durations.

In a possible implementation, the midamble indication information is different from indication information determined by the first device and used to indicate an HE-LTF in a preamble.

In a possible implementation, the midamble indication information includes a period field of the midamble, and the period field occupies at least two bits and is used to indicate one of at least three preset midamble periods.

In a possible implementation, the sending unit is further configured to send, to the second device through a reserved entry in an SRP field, a period of the midamble and/or the indication information used to indicate the duration of the HE-LTF symbol, or send, to the second device through a reserved bit, the indication information used to indicate the duration of the HE-LTF symbol.

In a possible implementation, the processing unit is further configured to obtain information about a midamble processing capability of the second device, and determine the threshold based on the capability information.

In a possible implementation, after sending the midamble indication information to the second device, the sending unit is further configured to send a midamble to the second device. The midamble is obtained by padding content included in an agreed midamble, and a duration of the midamble after padding is greater than or equal to the threshold.

Based on the same technical idea, an embodiment of this application further provides a device. The device may be used as a second device and configured to implement the foregoing method embodiments. The device includes a receiving unit configured to receive midamble indication information sent by a first device, where the receiving unit is further configured to receive a midamble according to the midamble indication information, and a processing unit configured to perform channel estimation based on the received midamble only when a duration of a midamble indicated by the midamble indication information is greater than or equal to a threshold, where the threshold is related to a processing capability of the second device.

A schematic diagram of a connection between the processing unit and a sending unit is similar to FIG. 8.

In a possible implementation, the device further includes a sending unit configured to before the receiving unit receives the midamble indication information sent by the first device, send information about a midamble processing capability of the second device to the first device.

In a possible implementation, the midamble indication information includes indication information used to indicate a quantity of HE-LTF symbols included in the midamble, and indication information used to indicate a duration of an HE-LTF symbol, where a product of the duration of the HE-LTF symbol and the quantity of HE-LTF symbols is greater than or equal to the preset threshold, or indication information of the duration of the midamble, including indication information used to indicate a quantity of STS used by the midamble, and indication information used to indicate a duration of an HE-LTF symbol, where a product of the duration of the HE-LTF symbol and a quantity of HE-LTF symbols corresponding to the STS is greater than or equal to the preset threshold.

In a possible implementation, the midamble indication information includes at least indication information used to indicate a duration of an HE-LTF symbol excluding a GI part and a duration of a GI. The duration of the HE-LTF symbol excluding the GI part is two or four basic symbol durations.

In a possible implementation, the midamble indication information is different from indication information determined by the first device and used to indicate an HE-LTF in a preamble.

Further, the duration of the midamble indicated by the midamble indication information is different from a duration of the HE-LTF indicated by the indication information of the HE-LTF.

In a possible implementation, the midamble indication information includes a period field of the midamble, and the period field occupies at least two bits and is used to indicate one of at least four preset midamble periods.

In a possible implementation, the receiving unit is further configured to receive, through a reserved entry in an SRP field, a period of the midamble and/or the indication information used to indicate the duration of the HE-LTF symbol, or receive, through a reserved bit, the indication information used to indicate the duration of the HE-LTF symbol.

In a possible implementation, the receiving unit receives a midamble according to the midamble indication information. The midamble is obtained by padding content included in an agreed midamble, and a duration of the midamble after padding is greater than or equal to the threshold.

Based on the same technical idea, an embodiment of this application further provides a device. The device may be used as a first device and configured to implement the foregoing method embodiments. The device includes a processing unit configured to obtain information about a midamble processing capability of a second device and determine midamble indication information based on the capability information, and a sending unit configured to send the midamble indication information to the second device.

A schematic diagram of a connection between the processing unit and the sending unit is similar to FIG. 7.

In a possible implementation, the capability information includes at least one of the following information a minimum value of the duration of the midamble that can be supported by the second device, information about whether the second device can support a SU Doppler mode and/or an ER SU Doppler mode, information about whether the second device can support a MU Doppler mode, a maximum quantity of STS occupied by the midamble and that can be supported by the second device, a maximum quantity of subcarriers occupied by the midamble and that can be supported by the second device, and information about a MCS that can be supported by the second device when the midamble occupies L subcarriers and K STS, where both L and K are integers greater than or equal to 1.

In a possible implementation, the midamble indication information is different from indication information determined by the first device and used to indicate an HE-LTF in a preamble.

Further, the duration of the midamble indicated by the midamble indication information is different from a duration of the HE-LTF indicated by the indication information of the HE-LTF.

In a possible implementation, the midamble indication information includes a period field of the midamble, and the period field occupies at least two bits and is used to indicate one of at least three preset midamble periods.

In a possible implementation, the sending unit is further configured to send, to the second device through a reserved entry in an SRP field, a period of the midamble and/or the indication information used to indicate the duration of the HE-LTF symbol, or send, to the second device through a reserved bit, the indication information used to indicate the duration of the HE-LTF symbol.

In a possible implementation, the sending unit is further configured to send, by the first device, a midamble to the second device. The midamble is obtained by padding content included in an agreed midamble, and a duration of the midamble after padding is greater than or equal to the threshold.

Figure 9:
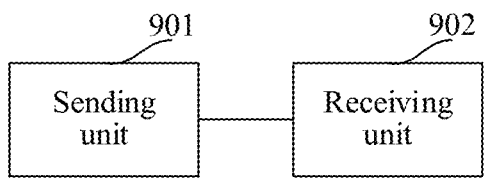
FIG. 9 is a third schematic structural diagram of a device according to an embodiment of this application.

Based on the same technical idea, an embodiment of this application further provides a device. The device may be used as a second device and configured to implement the foregoing method embodiments. FIG. 9 is a schematic structural diagram of the device. As shown in the figure, the device includes a sending unit 901 configured to send information about a midamble processing capability of the second device to a first device, and a receiving unit 902 configured to receive midamble indication information sent by the first device, where a duration of a midamble indicated by the midamble indication information is determined based on the capability information of the second device, and receive a midamble according to the indication information.

In a possible implementation, the capability information includes one of the following or a combination thereof a minimum value of the duration of the midamble that can be supported by the second device, information about whether the second device can support a SU Doppler mode and/or an ER SU Doppler mode, information about whether the second device can support a MU Doppler mode, a maximum quantity of STS occupied by the midamble and that can be supported by the second device, a maximum quantity of subcarriers occupied by the midamble and that can be supported by the second device, and information about a MCS that can be supported by the second device when the midamble occupies L subcarriers and K STS, where both L and K are integers greater than or equal to 1.

In a possible implementation, the midamble indication information is different from indication information determined by the first device and used to indicate an HE-LTF in a preamble.

Further, the duration of the midamble indicated by the midamble indication information is different from a duration of the HE-LTF indicated by the indication information of the HE-LTF.

In a possible implementation, the midamble indication information includes a period field of the midamble, and the period field occupies at least two bits and is used to indicate one of at least three preset midamble periods.

In a possible implementation, the receiving unit is further configured to send, to the second device through a reserved entry in an SRP field, a period of the midamble and/or the indication information used to indicate the duration of the HE-LTF symbol, or send, to the second device through a reserved bit, the indication information used to indicate the duration of the HE-LTF symbol.

In a possible implementation, after the second device receives the midamble indication information sent by the first device, the following is further included receiving a midamble sent by the first device. The midamble is obtained by padding content included in an agreed midamble, and a duration of the midamble after padding is greater than or equal to the threshold.

Based on the same technical idea, an embodiment of this application further provides a device. The device may be used as a first device and configured to implement the foregoing method embodiments. The device includes a processing unit configured to determine midamble indication information, and a sending unit configured to send the midamble indication information to a second device. The midamble indication information is different from indication information of an HE-LTF in a preamble sent by the first device to the second device.

A schematic diagram of a connection between the processing unit and the sending unit is similar to FIG. 7.

In a possible implementation, a duration of an HE-LTF symbol included in a midamble indicated by the midamble indication information is different from a duration of an HE-LTF symbol included in the HE-LTF indicated by the indication information of the HE-LTF.

Optionally, the HE-LTF in the preamble may use an HE-LTF symbol with a relatively short duration, while it indicates that the midamble uses an HE-LTF symbol with a relatively long duration. In the foregoing method, information about the duration of the midamble and information about the duration of the HE-LTF in the preamble are separately indicated, and therefore, a limitation on the duration of the midamble does not affect the HE-LTF in the preamble, thereby helping reduce signaling overheads of the preamble.

Optionally, the HE-LTF in the preamble may use an HE-LTF symbol with a relatively long duration, or use a relatively large quantity of HE-LTF symbols, to make initialization of channel estimation more accurate. On the other hand, the midamble uses an HE-LTF symbol with a relatively short duration or uses a relatively small quantity of HE-LTF symbols. A data receiving device performs an analysis by using a channel estimation result obtained based on the midamble and an initial channel estimation result, to improve accuracy of the channel estimation, and help reduce signaling overheads of the midamble.

Based on the same technical idea, an embodiment of this application further provides a device. The device may be used as a second device and configured to implement the foregoing method embodiments. The device includes a receiving unit configured to receive midamble indication information sent by a first device, where the midamble indication information is different from indication information of an HE-LTF sent by the first device to the second device, and receive a midamble according to the indication information, and a processing unit configured to perform processing based on the received midamble.

A schematic diagram of a connection between the processing unit and the sending unit is similar to FIG. 8.

In a possible implementation, a duration of an HE-LTF symbol included in a midamble indicated by the midamble indication information is different from a duration of an HE-LTF symbol included in the HE-LTF indicated by the indication information of the HE-LTF.

Based on the same technical idea, an embodiment of this application further provides a device. The device may be used as a first device and configured to implement the foregoing method embodiments. The device includes a processing unit configured to determine midamble indication information, where the midamble indication information is used to instruct a second device to decode, after receiving a midamble, an $(X+1)^{th}$ to $(X+M)^{th}$ data symbols after the midamble based on the midamble, where M signifies that the first device sends a midamble every time after the first device sends M data symbols, and X is an integer pre-agreed or determined based on a midamble processing capability of the second device and greater than or equal to 1, and a sending unit configured to send the midamble indication information to the second device.

A schematic diagram of a connection between the processing unit and the sending unit is similar to FIG. 7.

Based on the same technical idea, an embodiment of this application further provides a device. The device may be used as a second device and configured to implement the foregoing method embodiments. The device includes a receiving unit configured to receive a midamble, and a processing unit configured to perform channel estimation based on the midamble, and decode an $(X+1)^{th}$ to $(X+M)^{th}$ data symbols after the midamble according to a channel estimation result, where M signifies that the second device receives a midamble after receiving every M data symbols, and X is an integer pre-agreed or determined based on a midamble processing capability of the second device and greater than or equal to 1.

A schematic diagram of a connection between the receiving unit and the processing unit is similar to FIG. 8.

Figure 10:
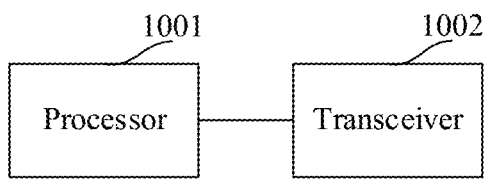
FIG. 10 is a fourth schematic structural diagram of a device according to an embodiment of this application.

Based on the same technical idea, an embodiment of this application further provides a device. The device may be used as a first device and configured to implement the foregoing method embodiments. A schematic structural diagram of the device may be shown in FIG. 10, which includes a processor 1001 and a transceiver 1002.

The processor 1001 may perform, by using the transceiver 1002, the method steps performed by the first device in any one of the foregoing method embodiments.

Figure 11:
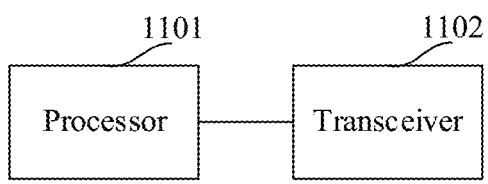
FIG. 11 is a fifth schematic structural diagram of a device according to an embodiment of this application.

Based on the same technical idea, an embodiment of this application further provides a device. The device may be used as a second device and configured to implement the foregoing method embodiments. A schematic structural diagram of the device may be shown in FIG. 11, which includes a processor 1101 and a transceiver 1102.

The processor 1101 may perform, by using the transceiver 1102, the method steps performed by the second device in any one of the foregoing method embodiments.

An embodiment of this application further provides a computer storage medium. The storage medium stores a software program. The software program, when being read and executed by one or more processors, can implement the method in any one of the embodiments according to the first to tenth aspects.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, or the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special purpose computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a particular manner, so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or another programmable device provide steps for implementing a function in one or more processes in the flowcharts and/or in one or more blocks in the block diagrams.

Obviously, a person skilled in the art can make various modifications and variations to this application without departing from the scope of this application. In this way, this application is intended to cover these modifications and variations of this application provided that they fall within the scope of protection defined by the claims of this application.

What is claimed is:

1. A midamble indication method, comprising:
    sending, by a first device, midamble indication information to a second device,
    wherein a duration of a midamble indicated by the midamble indication information is greater than or equal to a threshold, and
    wherein the threshold is related to a processing capability of the second device.

2. The midamble indication method of claim 1, wherein the midamble indication information comprises:
    indication information indicating a quantity of high-efficiency long training field (HE-LTF) symbols comprised in the midamble and indication information indicating a duration of an HE-LTF symbol, wherein a product of the duration of the HE-LTF symbol and the quantity of HE-LTF symbols is greater than or equal to the threshold; or
    indication information of the duration of the midamble and comprising indication information indicating a quantity of space time streams used by the midamble and indication information indicating a duration of an HE-LTF symbol, wherein a product of the duration of the HE-LTF symbol and a quantity of HE-LTF symbols corresponding to the space time streams is greater than or equal to the threshold.

3. The midamble indication method of claim 1, wherein the midamble indication information comprises indication information indicating a duration of a high-efficiency long training field (HE-LTF) and a duration of a guard interval (GI), and wherein the duration of the HE-LTF is two or four basic symbol durations.

4. The midamble indication method of claim 1, further comprising determining, by the first device, indication information indicating a high-efficiency long training field in a preamble, wherein the indication information is different from the midamble indication information.

5. The midamble indication method of claim 1, wherein the midamble indication information comprises a period field of the midamble, and wherein the period field occupies at least two bits and indicates one of at least three preset midamble periods.

6. The midamble indication method of claim 1, wherein sending the midamble indication information comprises:
    sending, by the first device to the second device through a reserved entry in a spatial reuse parameter (SRP) field, a period of the midamble and/or indication information indicating the duration of a high-efficiency long training field (HE-LTF) symbol comprised in the midamble; or
    sending, by the first device to the second device through a reserved bit, the indication information.

7. The midamble indication method of claim 1, wherein before sending the midamble indication information, the method further comprises:
    obtaining, by the first device, capability information indicating a midamble processing capability of the second device; and
    determining, by the first device, the threshold based on the capability information.

8. The midamble indication method of claim 1, wherein after sending the midamble indication information, the method further comprises sending, by the first device, a midamble to the second device, wherein the midamble is based on padding content comprised in an agreed midamble, and wherein a duration of the midamble after padding is greater than or equal to the threshold.

9. A midamble receiving method, comprising:
    receiving, by a second device, midamble indication information from a first device, wherein the midamble indication information indicates a duration of a midamble; and
    performing, by the second device, channel estimation based on a received midamble responsive to the duration being greater than or equal to a threshold,
    wherein the threshold is related to a processing capability of the second device.

10. The midamble receiving method of claim 9, wherein before receiving the midamble indication information, the method further comprises sending, by the second device to the first device, information indicating the processing capability.

11. A first device, comprising:
    a processor configured to determine midamble indication information, wherein a duration of a midamble indicated by the midamble indication information is greater than or equal to a threshold, and wherein the threshold is related to a processing capability of a second device; and a transceiver coupled to the processor, and configured to send the midamble indication information to the second device.

12. The first device of claim 11, wherein the midamble indication information comprises:

indication information indicating a quantity of high-efficiency long training field (HE-LTF) symbols comprised in the midamble, and indication information indicating a duration of an HE-LTF symbol, wherein a product of the duration of the HE-LTF symbol and the quantity of HE-LTF symbols is greater than or equal to the threshold; or indication information of the duration of the midamble, and comprising indication information indicating a quantity of space time streams used by the midamble, and indication information indicating a duration of an HE-LTF symbol, wherein a product of the duration of the HE-LTF symbol and a quantity of HE-LTF symbols corresponding to the space time streams is greater than or equal to the threshold.

13. The first device of claim 11, wherein the midamble indication information comprises indication information indicating a duration of a high-efficiency long training field (HE-LTF) and a duration of a guard interval (GI), and wherein the duration of the HE-LTF is two or four basic symbol durations.

14. The first device of claim 11, wherein the processor is further configured to determine indication information indicating a high-efficiency long training field in a preamble, wherein the indication information is different from the midamble indication information.

15. The first device of claim 11, wherein the midamble indication information comprises a period field of the midamble, and wherein the period field occupies at least two bits and indicates one of at least three preset midamble periods.

16. The first device of claim 11, wherein the processor is further configured to cause the transceiver to:

send a period of the midamble and/or indication information indicating the duration of a high-efficiency long training field (HE-LTF) symbol comprised in the midamble to the second device through a reserved entry in a spatial reuse parameter (SRP) field; or send the indication information to the second device through a reserved bit.

17. The first device of claim 11, wherein the processor is further configured to:

obtain capability information indicating a midamble processing capability of the second device; and determine the threshold based on the capability information.

18. The first device of claim 11, wherein the processor is further configured to cause the transceiver to send a midamble to the second device, wherein the midamble is based on padding content comprised in an agreed midamble, and wherein a duration of the midamble after padding is greater than or equal to the threshold.

19. A second device, comprising:

a transceiver configured to receive midamble indication information from a first device, wherein the midamble indication information indicates a duration of a midamble; and a processor coupled to the transceiver, the processor configured to perform channel estimation based on a received midamble responsive to the duration being greater than or equal to a threshold, wherein the threshold is related to a processing capability of the second device.

20. The second device of claim 19, wherein before the transceiver receives the midamble indication information, the transceiver is further configured to send information indicating the processing capability to the first device.

* * * * *

UNITED STATES PATENT AND TRADEMARK OFFICE
CERTIFICATE OF CORRECTION

PATENT NO. : 11,451,423 B2
APPLICATION NO. : 17/324826
DATED : September 20, 2022
INVENTOR(S) : Jian Yu et al.

It is certified that error appears in the above-identified patent and that said Letters Patent is hereby corrected as shown below:

On the Title Page

Item (30) Foreign Application Priority Data should read:
"(30) Foreign Application Priority Data:
Aug. 31, 2017 (CN) 201710776252.7"

Signed and Sealed this
Twenty-second Day of November, 2022

Katherine Kelly Vidal
*Director of the United States Patent and Trademark Office*